(12) United States Patent
Kulkarni et al.

(10) Patent No.: US 9,090,189 B2
(45) Date of Patent: Jul. 28, 2015

(54) VEHICLE SEAT BACKREST WITH FLEXURAL JOINT MOTION-CONTROL

(71) Applicant: Faurecia Automotive Seating, LLC, Troy, MI (US)

(72) Inventors: Amit Kulkarni, Troy, MI (US); David Goligorsky, Cambridge, MA (US); Timothy R. Proulx, Nashua, NH (US)

(73) Assignee: Faurecia Automotive Seating, LLC, Troy, MI (US)

( * ) Notice: Subject to any disclaimer, the term of this patent is extended or adjusted under 35 U.S.C. 154(b) by 235 days.

(21) Appl. No.: 13/627,725

(22) Filed: Sep. 26, 2012

(65) Prior Publication Data

US 2013/0076092 A1 Mar. 28, 2013

Related U.S. Application Data

(60) Provisional application No. 61/539,256, filed on Sep. 26, 2011, provisional application No. 61/540,397, filed on Sep. 28, 2011.

(51) Int. Cl.
*B60N 2/02* (2006.01)
*B60N 2/64* (2006.01)
*B60N 2/66* (2006.01)

(52) U.S. Cl.
CPC . *B60N 2/643* (2013.01); *B60N 2/66* (2013.01)

(58) Field of Classification Search
CPC .................................. B60N 2/643; B60N 2/66
USPC .......................... 297/284.1, 284.2, 284.4, 285
See application file for complete search history.

(56) References Cited

U.S. PATENT DOCUMENTS

| 3,565,482 | A  | * | 2/1971 | Blodee | 297/284.3 |
|---|---|---|---|---|---|
| 6,309,018 | B1 | * | 10/2001 | Jernstrom | 297/284.1 |
| 7,021,706 | B2 |  | 4/2006 | Aufrere et al. | |
| 7,066,537 | B2 | * | 6/2006 | Coffield et al. | 297/284.4 |
| 7,611,199 | B2 | * | 11/2009 | Michalak et al. | 297/300.2 |
| 2005/0184568 | A1 | * | 8/2005 | Schmidt et al. | 297/284.4 |
| 2008/0136240 | A1 |  | 6/2008 | Matthews et al. | |
| 2010/0148546 | A1 |  | 6/2010 | Demontis et al. | |
| 2011/0121624 | A1 |  | 5/2011 | Brncick et al. | |

OTHER PUBLICATIONS

International Search Report for PCT/US2012/057342, dated Feb. 27, 2013, 3 pages.
Written Opinion for PCT/US2012/057342, dated Feb. 27, 2013, 5 pages.
Extended European Search Report for application No. EP 12 83 7026, dated Mar. 30, 2015, 7 pages.

* cited by examiner

*Primary Examiner* — Philip Gabler
(74) *Attorney, Agent, or Firm* — Reising Ethington P.C.

(57) ABSTRACT

A vehicle seat includes a backrest coupled to an upwardly extending support frame. The backrest includes a deformable seat shell adapted to assume various shapes between an initial position and a final position in response to variable rearward loads applied by the torso of a seated passenger. The seat shell is coupled to the support frame by a compliant shell-motion controller via upper and lower motion-control links. At least one of the motion-control links includes a flexural portion configured to bend about a pivot axis to establish a flexural joint. The lower motion-control link may include a flexural joint and/or a revolute joint, and the upper motion control link may include a flexural, revolute, or spheroidal joint.

15 Claims, 26 Drawing Sheets

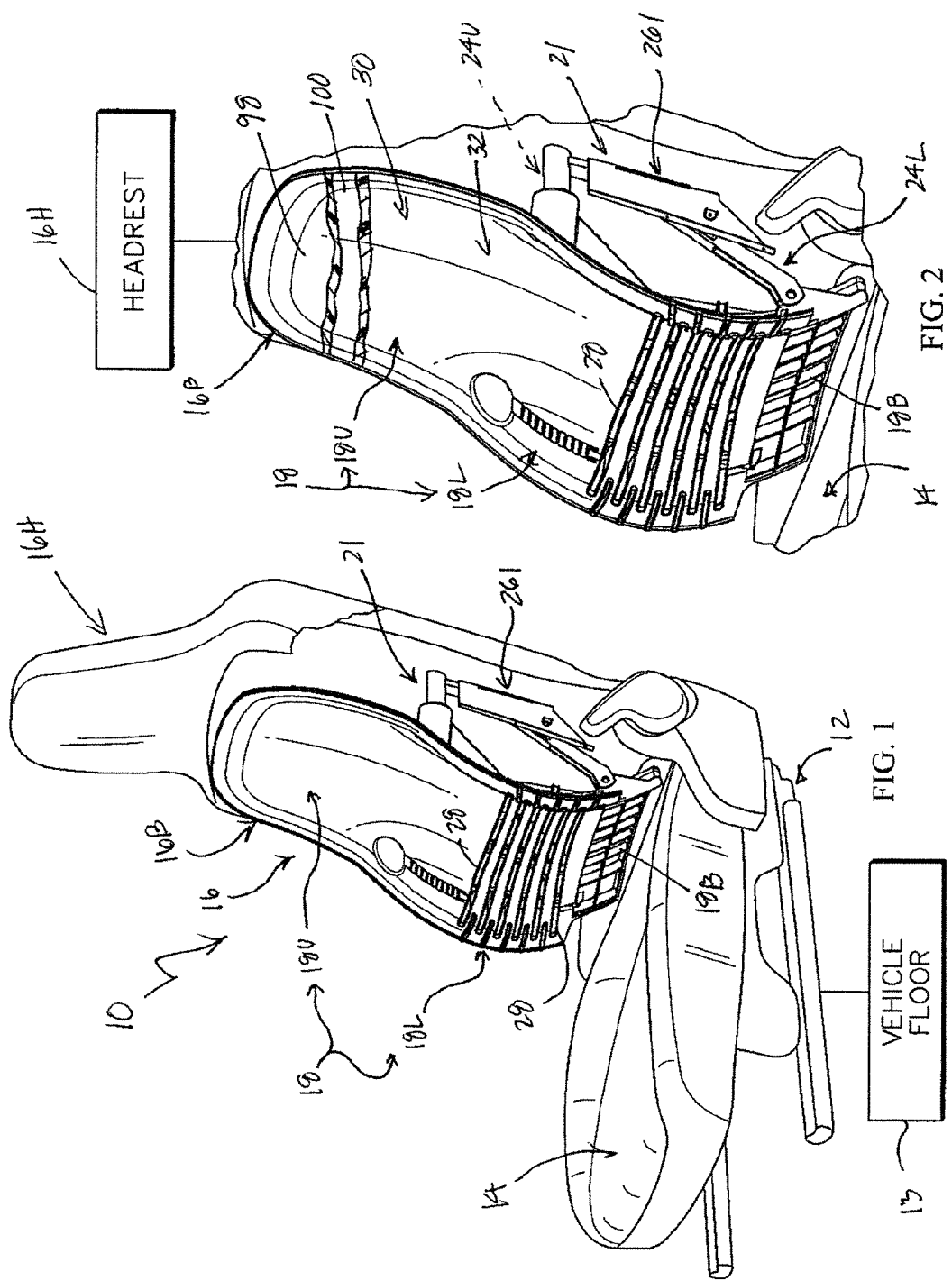

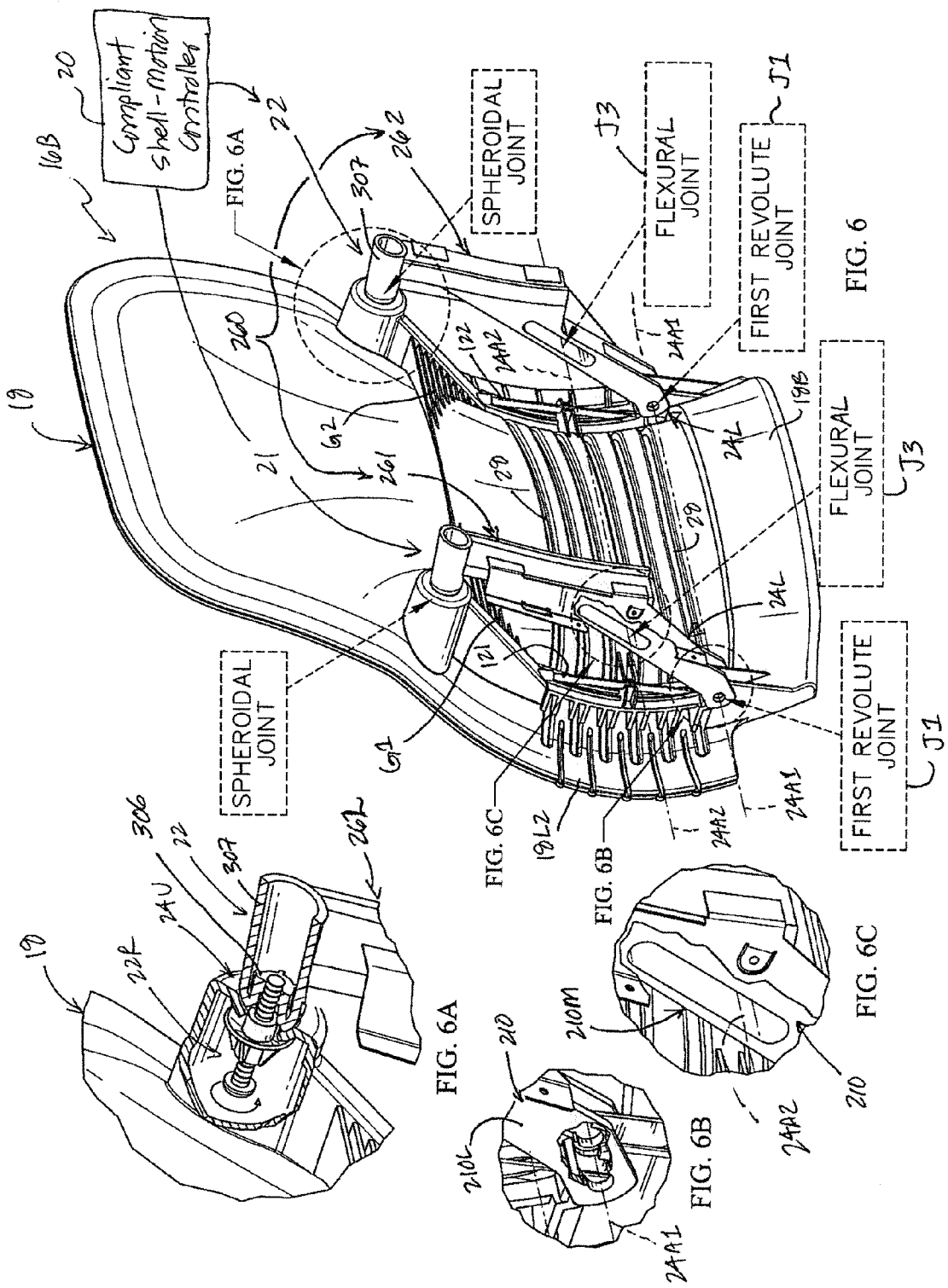

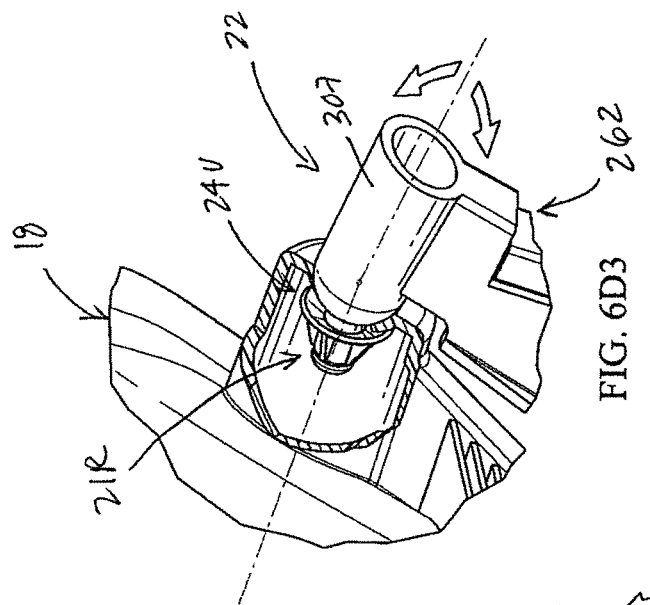
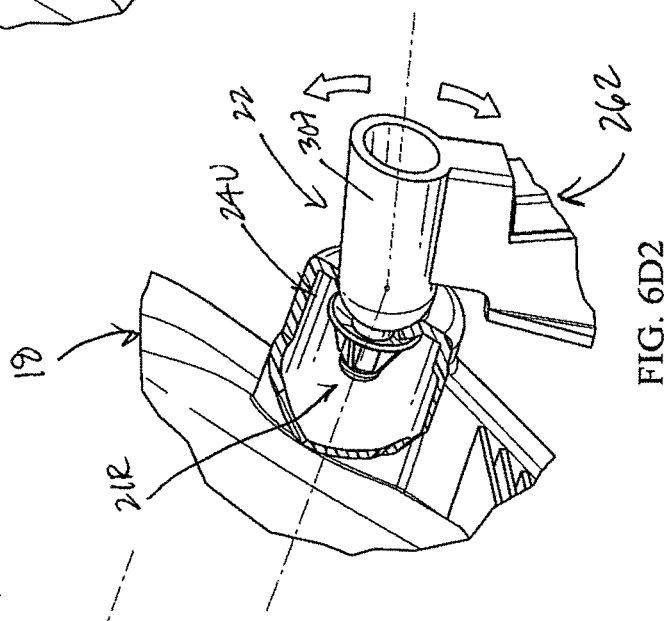
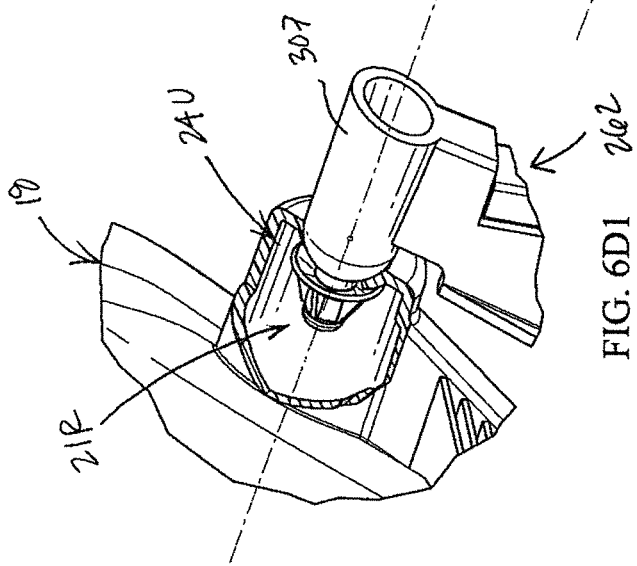
FIG. 6D1
FIG. 6D2
FIG. 6D3

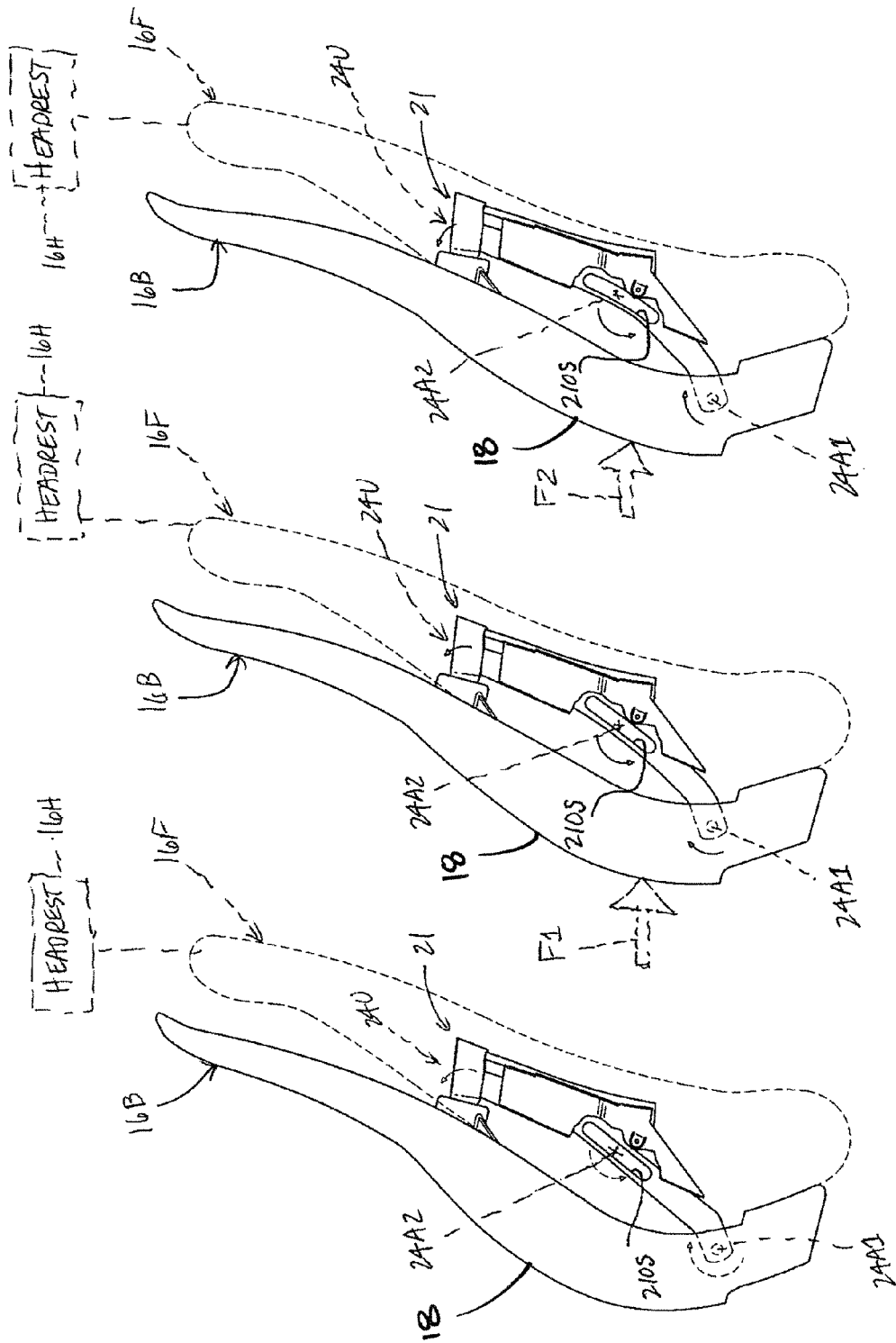

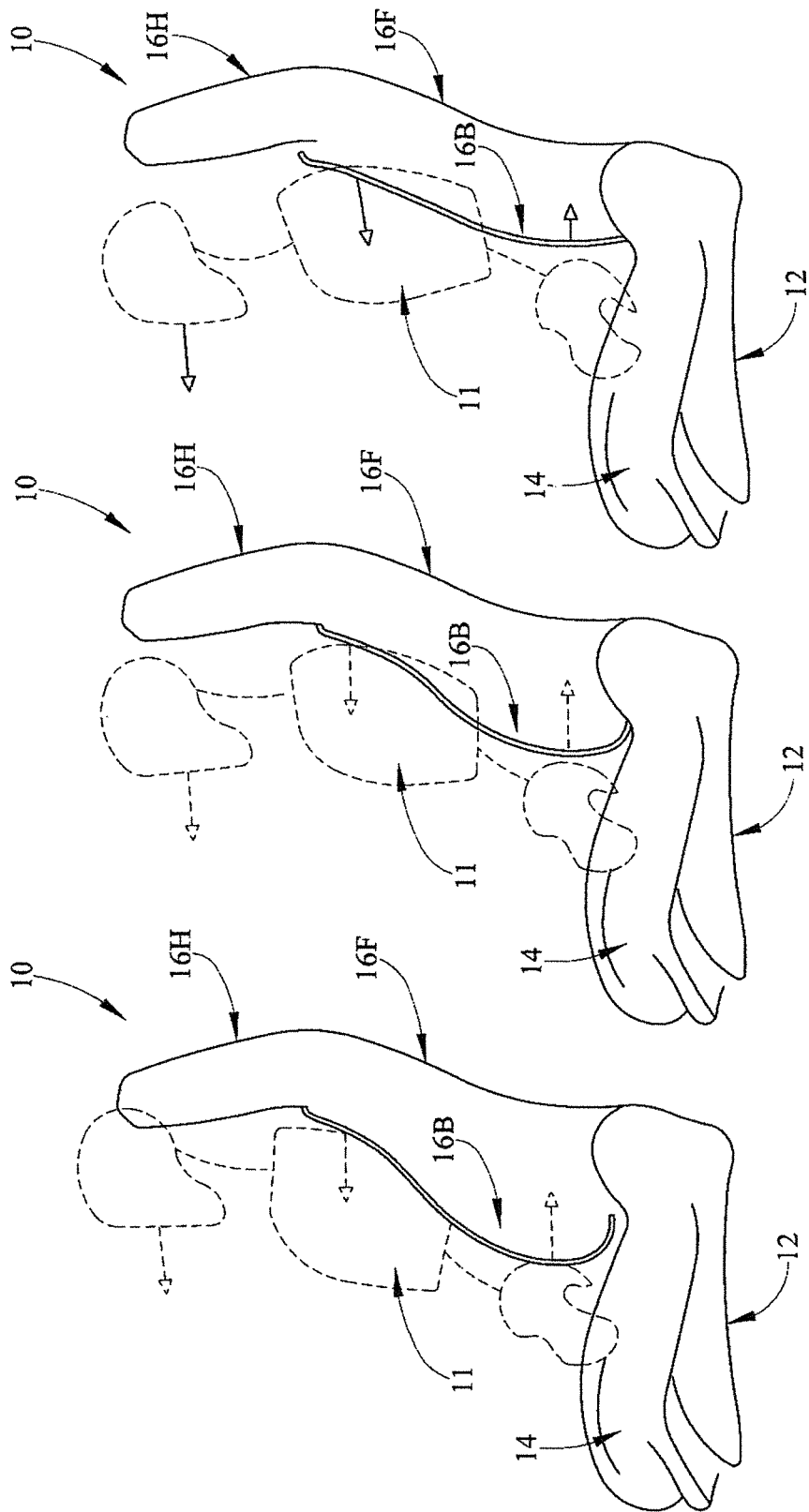

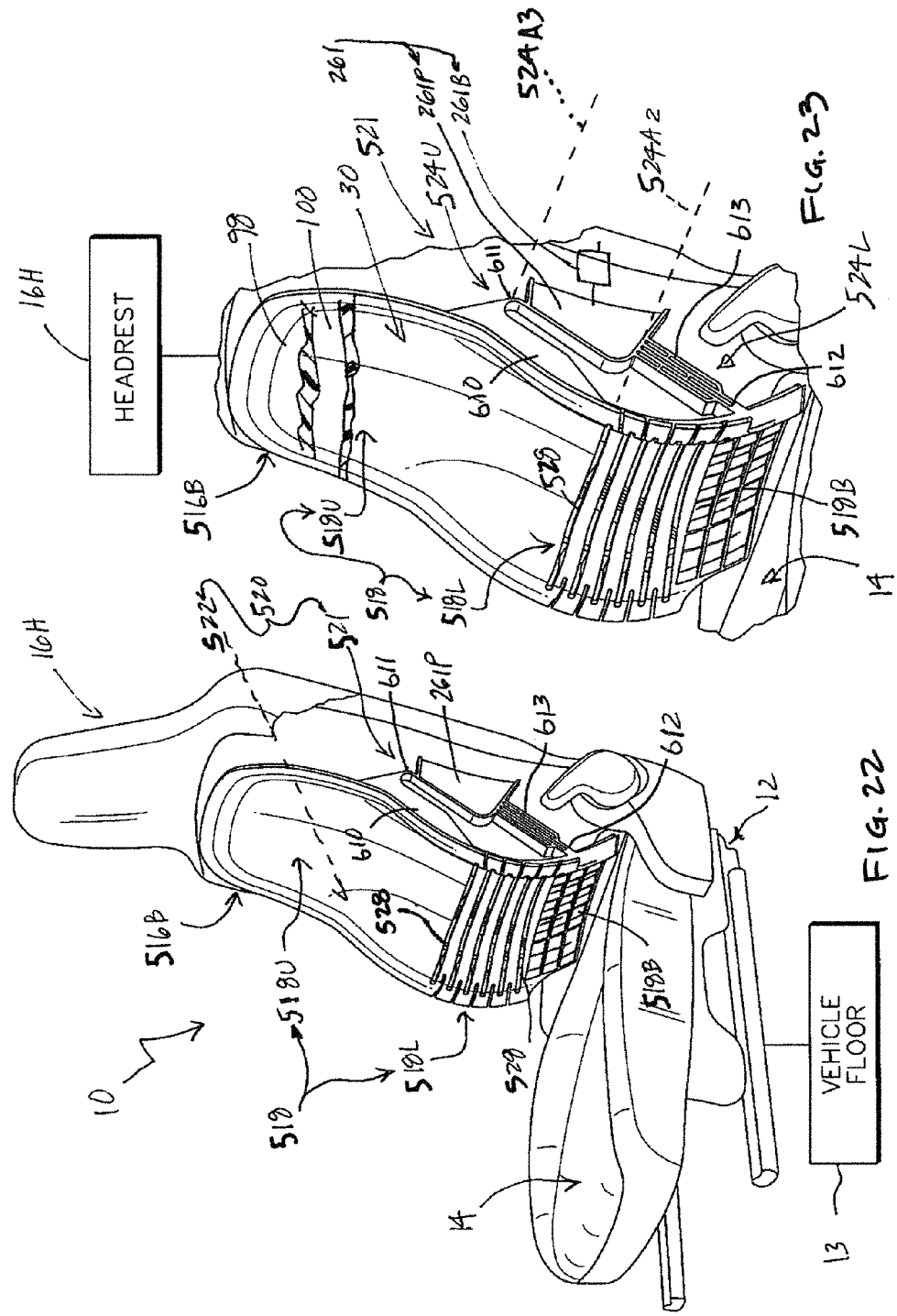

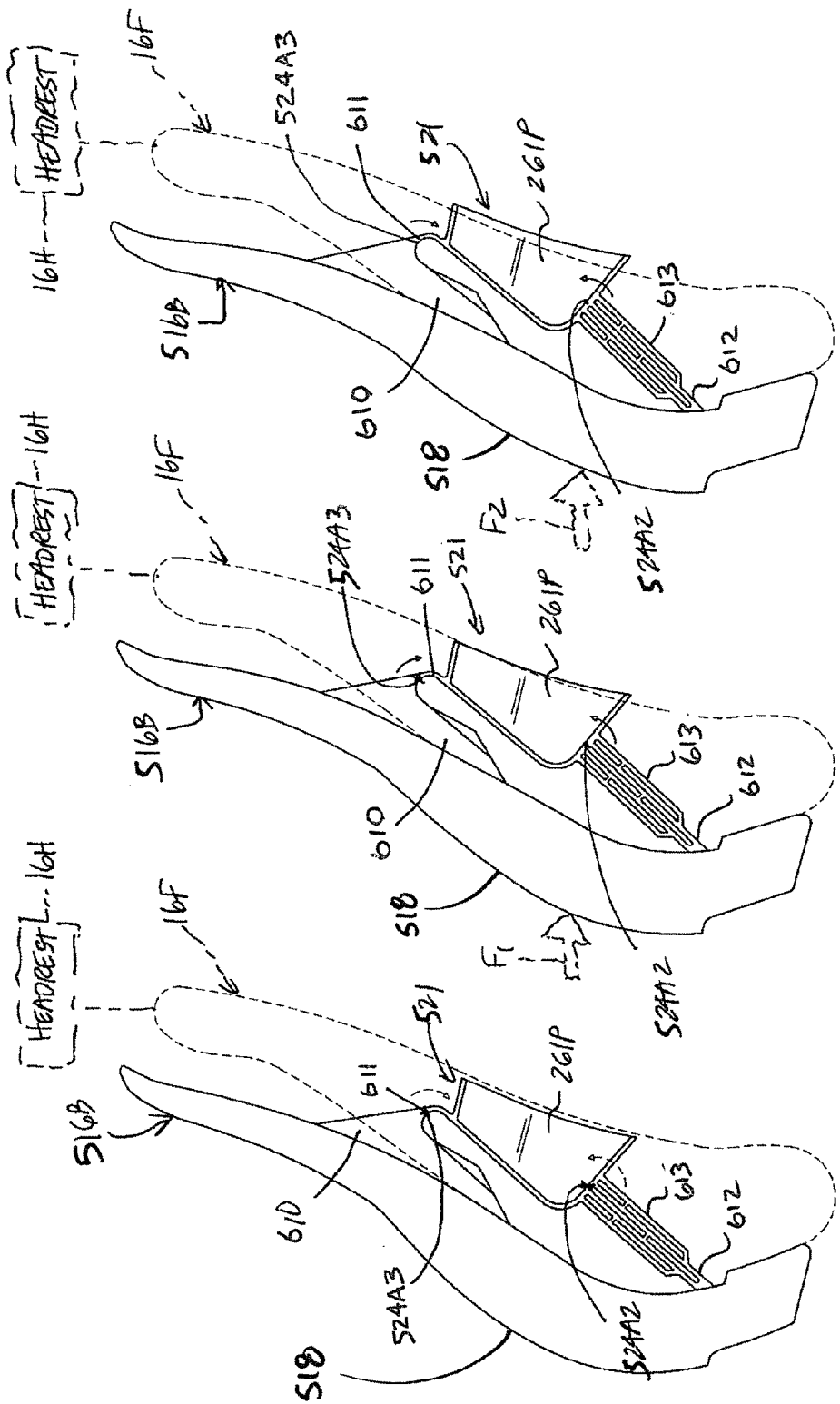

VEHICLE SEAT BACKREST WITH FLEXURAL JOINT MOTION-CONTROL

CROSS-REFERENCE TO RELATED APPLICATIONS

This application claims the benefit of U.S. Provisional Application No. 61/539,256 filed Sep. 26, 2011 and U.S. Provisional Application No. 61/540,397 filed Sep. 28, 2011. The entire contents of these two prior applications are hereby incorporated by reference.

TECHNICAL FIELD

The present disclosure relates to a vehicle seat, and particularly to a seat including an expandable and contractable portion. More particularly, the present disclosure relates to a vehicle seat including a seat back having a variable shape.

BACKGROUND

Vehicle seats typically include a generally horizontal seat bottom and a generally upright seat back. Vehicle occupants are seated on the seat bottom, which normally includes cushioning for comfort. The seat back may also include cushioning for comfort, but because of the upright position of the seat back, the occupant's weight is not always useful to ensure a comfortable, conforming fit of the seat back with the occupant's body. Further, not all vehicle occupants sit with the same posture. Some occupants sit in a relatively upright position, while others may sit in a slumping position. These different postures place parts of the occupant's body in different physical locations from each other. Thus, a seat back with a fixed shape or contour is likely to properly fit and support only a small portion of possible occupants. While some seat backs are constructed with a user selectable contour, there are typically only a finite number of contours to select from, which may or may not be suitable for a particular occupant. In addition, an occupant may shift in his or her seat from time to time. This shifting can resulting in changes in posture so that even a properly adjusted seat back contour becomes improper without additional adjustment to suit the occupant's shifted position.

SUMMARY

According to the present disclosure, a vehicle seat includes a seat bottom and a seat back extending upwardly from the seat bottom. The seat back includes a seat foundation under the seat bottom and a backrest coupled to the seat foundation.

In illustrative embodiments, the backrest includes a support frame coupled to the seat foundation, a deformable seat shell, and a compliant shell-motion controller configured to provide means for supporting the deformable seat shell for predictable shape-changing movement relative to the support frame from an initial (lordosis) position to a final (kyphosis) position in response to a force applied to the deformable seat shell in a direction toward the support frame by a passenger sitting on the seat bottom as the passenger moves around and changes position in the vehicle seat so that a back of the passenger is supported automatically by the deformable seat shell in a customized manner regardless of the posture of the seated passenger. The compliant shell-motion controller is located between and coupled to the support frame and the deformable seat shell.

In illustrative embodiments, the compliant shell-motion controller includes a link foundation coupled to the support frame to lie in a fixed position relative to the support frame during shape-changing movement of the deformable seat shell relative to the support frame. The compliant shell-motion controller also includes upper and lower motion-control links that are arranged to lie between and to interconnect the link foundation to the deformable seat shell to cause the deformable seat shell to move in a controlled manner relative to the link foundation when the deformable seat shell is exposed to external forces generated by a passenger moving around and changing position in the vehicle seat.

In illustrative embodiments, the upper motion-control link is a spheroidal (ball-and-socket) joint comprising a ball coupled to the link foundation and a ball-receiving socket coupled to the deformable seat shell. In other illustrative embodiments, the upper motion-control link is configured to establish a revolute (pivot) joint.

In illustrative embodiments, the upper motion-control link is configured to establish a flexural joint. The upper motion-control link includes an upper root portion coupled to the deformable seat shell and a flexural portion that is arranged to interconnect the upper root portion and the link foundation and is configured to bend about a pivot axis so as to establish the flexural joint.

In illustrative embodiments, the lower motion-control link is a pivotable strut coupled at an inner end thereof to a gusset included in the deformable seat shell for pivotable movement about a pivot axis and coupled at an outer end thereof to the link foundation. The pivotable strut includes a flexural portion that is configured to bend about another spaced-apart and parallel pivot axis so as to establish a flexural joint located between a revolute (pivot) joint located at the inner end of the pivotable strut and a spheroidal (ball-and-socket) joint of the upper motion-control link.

In illustrative embodiments, the lower motion-control link is configured to establish a flexural joint. The lower motion-control link includes a lower root portion coupled to the deformable seat shell and a flexural portion that is arranged to interconnect the lower root portion and the link foundation and configured to bend about a pivot axis.

In illustrative embodiments, the upper and lower motion-control links are each configured to establish flexural joints with flexural portions configured to bend about spaced-apart pivot axes in parallel relation.

In illustrative embodiments, the link foundation includes a stationary mount and a mounting bracket. The stationary mount interconnects flexural portions of companion upper and lower motion-control links. The deformable seat shell, stationary mount, and companion upper and lower motion-control links can be made of a plastics material and cooperate to form a monolithic component. The mounting bracket is configured to mate with both of the support frame of the backrest and a companion stationary mount to support the deformable seat-shell for movement relative to the support frame.

In illustrative embodiments, the deformable seat shell extends laterally across the width of the support frame. The compliant shell-motion controller includes a first shell mount coupled to a first (near) side of the deformable seat shell and a second shell mount coupled to a second (far) side of the deformable seat shell and arranged to lie in laterally spaced-apart relation to the first shell mount. The first shell mount may include a first pair of upper and lower motion-control links and may include two flexural joints. The second shell mount may include a second pair of upper and lower motion-control links and may include two more flexural joints.

In accordance with one embodiment, a vehicle seat includes a foundation adapted for attachment to a vehicle floor and a seat bottom mounted on the seat foundation. The vehicle seat further includes a support frame extending upwardly from the seat bottom and a deformable seat shell adapted to assume various shapes between an initial lordosis position and a final kyphosis position in response to a variable rearward load applied by the torso of a passenger seated on the seat bottom. A compliant shell-motion controller couples the deformable seat shell with the support frame via one or more stationary mounts and upper and lower motion-control links. The upper and lower motion-control links extend between the stationary mount(s) and the deformable seat shell. The upper motion-control links, the lower motion-control links, or both, have a flexural portion that bends during shape-changing deformation of the deformable seat shell caused by the rearward load applied by the torso of the seated passenger.

In accordance with another embodiment, a vehicle seat includes a foundation adapted for attachment to a vehicle floor and a seat bottom mounted on the seat foundation. The vehicle seat further includes a support frame extending upwardly from the seat bottom and a deformable seat shell adapted to assume various shapes between an initial lordosis position and a final kyphosis position in response to a variable rearward load applied by the torso of a passenger seated on the seat bottom. The vehicle seat also includes first and second shell mounts. Each shell mount has a stationary mount coupled to the support frame at a fixed location and first and second joints coupling the deformable seat shell to the stationary mount. Each of the first and second joints is configured for movement about respective first and second pivot axes, and at least one of the joints is a flexural joint configured for bending movement about one of the pivot axes.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

Preferred exemplary embodiments will hereinafter be described in conjunction with the appended drawings, wherein like designations denote like elements, and wherein:

FIG. 1 is a cutaway perspective view of an illustrative vehicle seat, including a backrest having a deformable seat shell and a compliant shell-motion controller according to one embodiment;

FIG. 2 is an enlarged view of the vehicle seat of FIG. 1;

FIG. 6 is a rear perspective view of the backrest from the vehicle seat of FIG. 1, showing upper and lower motion-control links;

FIG. 6A is an enlarged and partially cutaway view of a spheroidal joint of the upper motion-control link of FIG. 6;

FIG. 6B is an enlarged and partially cutaway view of a revolute joint of the lower motion-control link of FIG. 6;

FIG. 6C is an enlarged view of a flexural joint of the lower motion-control link of FIG. 6;

FIG. 6D1-6D3 are views of the spheroidal joint of FIG. 6A, showing motion about an indefinite number of axes;

FIG. 13 is a side view of the backrest of FIG. 6, showing the deformable seat shell in an initial (lordosis) position;

FIG. 14 is a side view of the backrest of FIG. 6, showing the deformable seat shell in a mid-range or transition position;

FIG. 15 is a side view of the backrest of FIG. 6, showing the deformable seat shell in a final (kyphosis) position;

FIG. 16 is a side view of one embodiment of a vehicle seat, showing a passenger sitting in an upright position with the deformable seat shell in the initial (lordosis) position;

FIG. 17 is a side view of the vehicle seat of FIG. 16, showing the passenger sitting in a mid-range position with the deformable seat shell in the transition position;

FIG. 18 is a side view of the vehicle seat of FIG. 16, showing the passenger sitting in a slouch position with the deformable seat shell in the final (kyphosis) position;

FIG. 22 is a cutaway perspective view of an illustrative vehicle seat, including a backrest having a deformable seat shell and a compliant shell-motion controller according to another embodiment;

FIG. 23 is an enlarged view of the vehicle seat of FIG. 22;

FIG. 28A is an enlarged view the upper motion-control link of FIG. 28, where the link includes a flexural joint;

FIG. 28B is an enlarged view of a flexural joint of the lower motion-control link of FIG. 28;

FIG. 34 is a side view of the backrest of FIG. 26, showing the deformable seat shell in an initial (lordosis) position;

FIG. 35 is a side view of the backrest of FIG. 26, showing the deformable seat shell in a mid-range or transition position; and FIG. 36 is a side view of the backrest of FIG. 26, showing the deformable seat shell in a final (kyphosis) position.

DETAILED DESCRIPTION

Figure 3A:
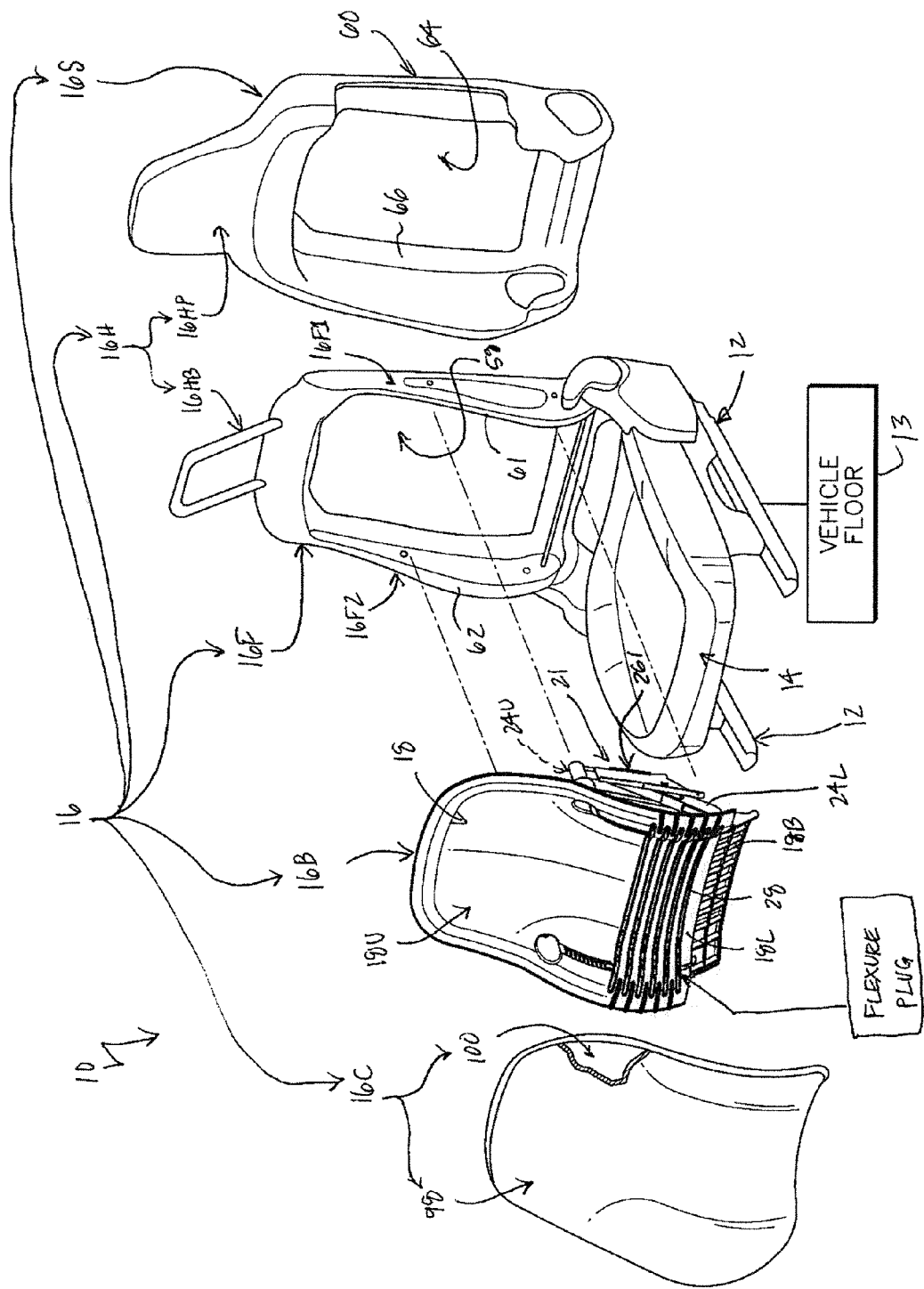
FIG. 3A is an exploded view of the vehicle seat of FIG. 1.
Figure 3B:
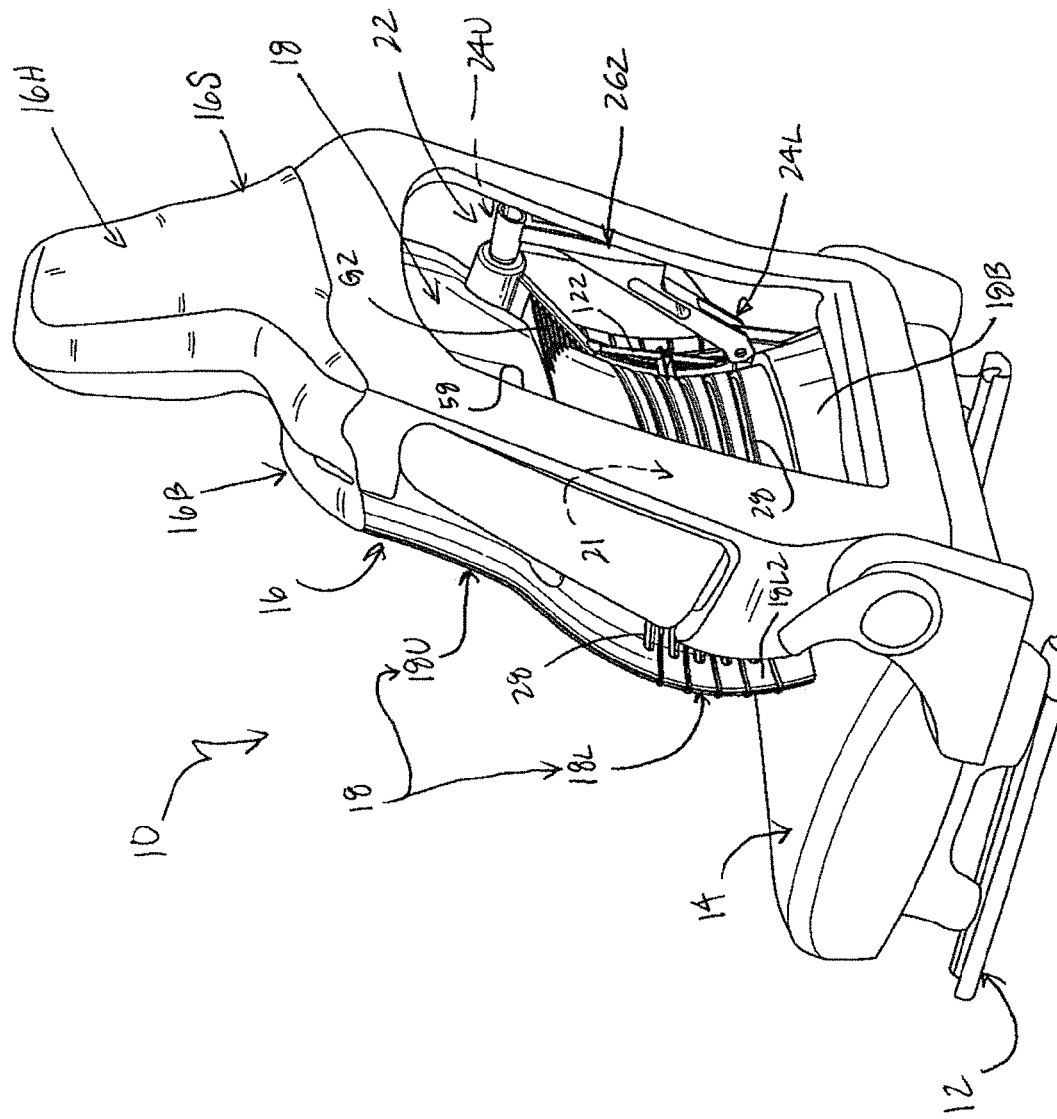
FIG. 3B is a rear perspective view of the vehicle seat of FIG. 1.

A vehicle seat 10 includes a seat foundation 12 adapted to be anchored to a vehicle floor 13, a seat bottom 14 mounted on seat foundation 12, and a seat back 16 arranged to extend upwardly from seat bottom 14 as suggested in FIGS. 1-3B. Seat back 16 includes a backrest 16B that is made in accordance with the present disclosure to provide a compliant shell system that provides custom lumbar support to upright-sitting, position-changing, and slouching passengers seated on vehicle seat 10 as suggested, for example, in FIGS. 16-18.

Figure 19:
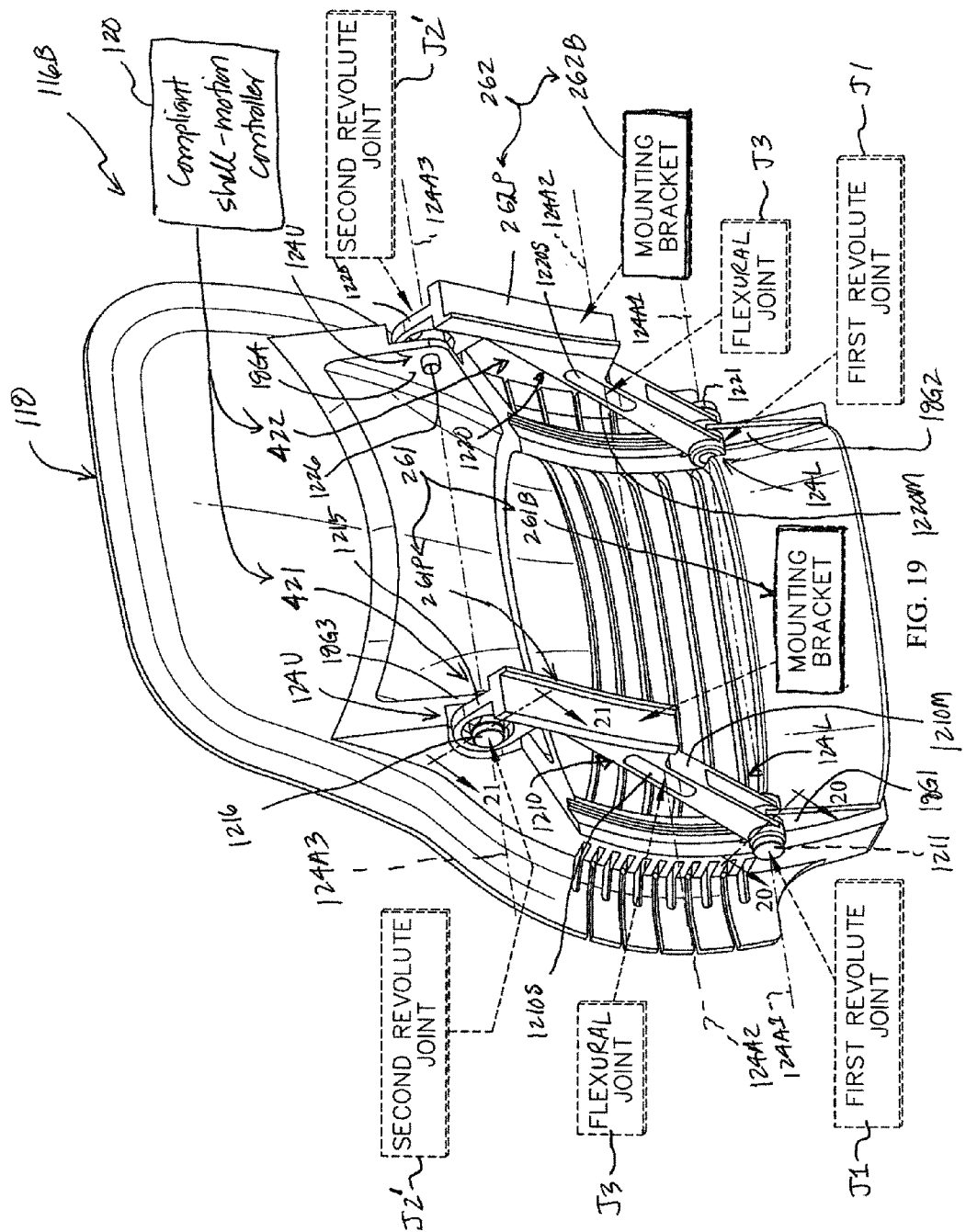
FIG. 19 is a rear perspective view of the another embodiment of a backrest for use with a vehicle seat, where the upper and lower motion-control links include revolute joints.
Figure 21:
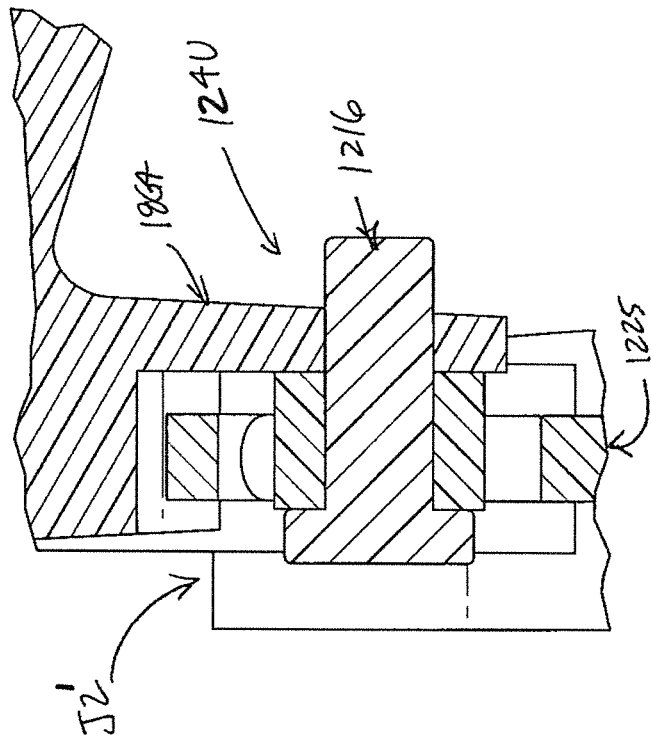
FIG. 21 is a cross-sectional view of a revolute joint of the upper motion-control link of FIG. 19.
Figure 20:
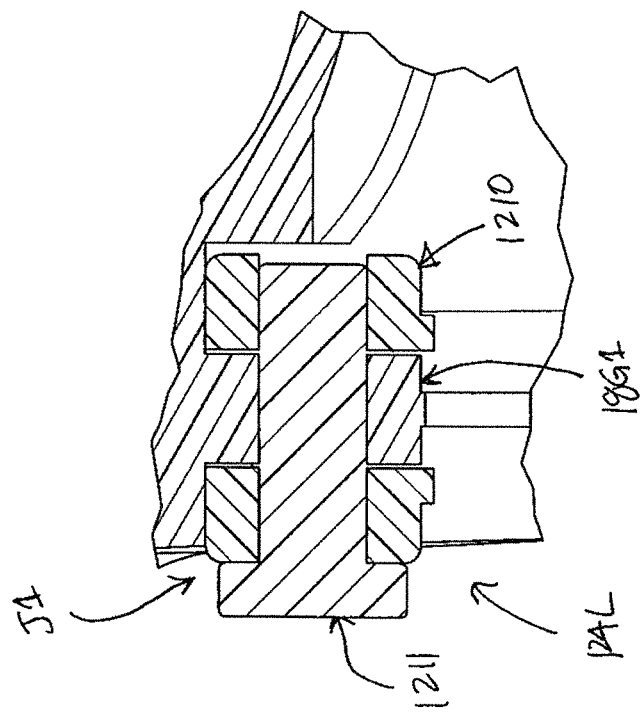
FIG. 20 is a cross-sectional view of a revolute joint of the lower motion-control link of FIG. 19.

A backrest 16B in accordance with one embodiment of the present disclosure is shown in FIGS. 1-15. A backrest 116B in accordance with another embodiment of the present disclosure is shown in FIGS. 19-21. And a backrest 516B in accordance with another embodiment is shown in FIGS. 22-36. Backrest 16B includes a compliant shell-motion controller 20, backrest 116B includes a compliant shell-motion controller 120, and backrest 516B includes a compliant shell-motion controller 520. The illustrated embodiments are non-limiting and are described here merely as exemplary implementations of the teachings presented herein.

Figure 4:
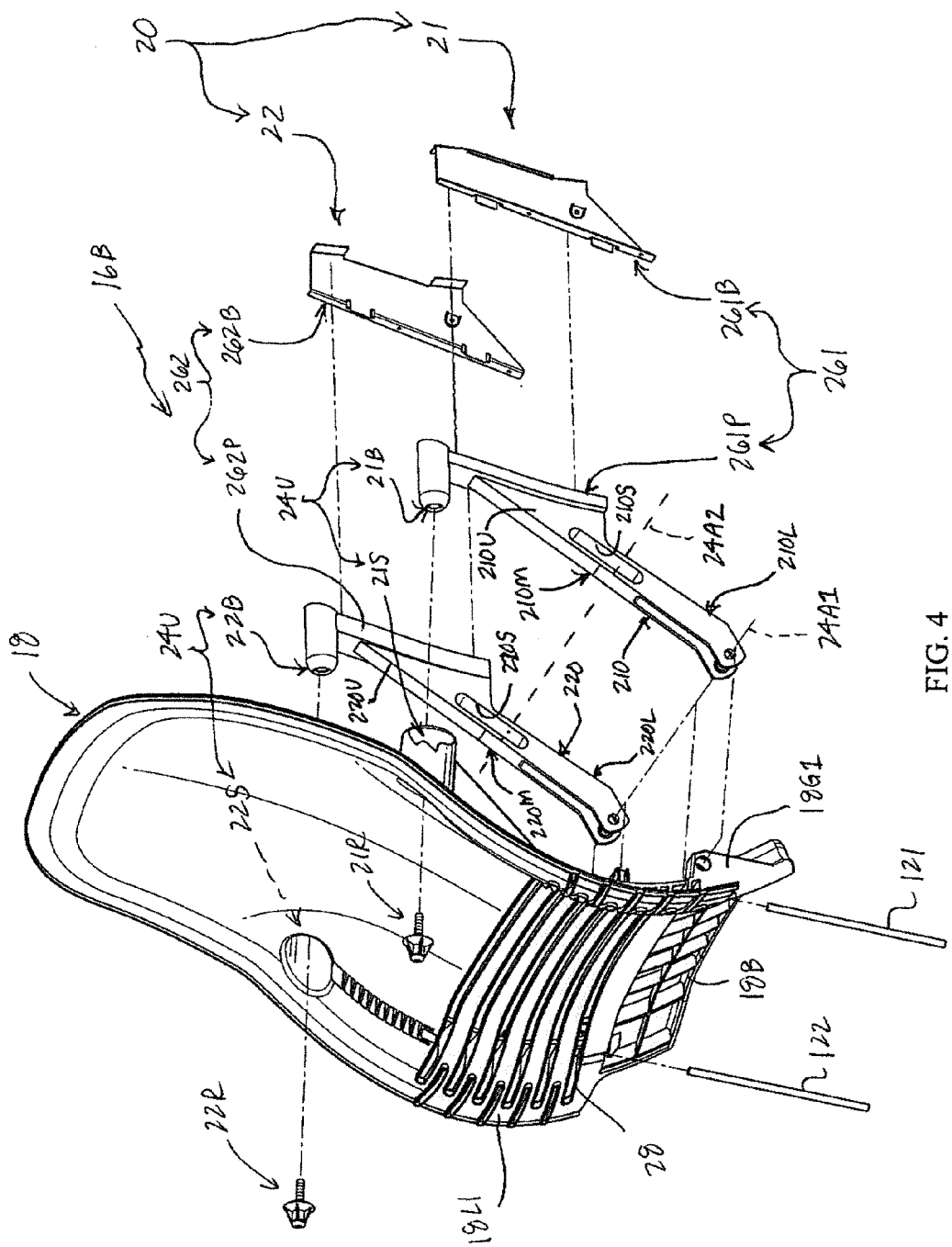
FIG. 4 is a front exploded view of the backrest from the vehicle seat of FIG. 1.
Figure 5:
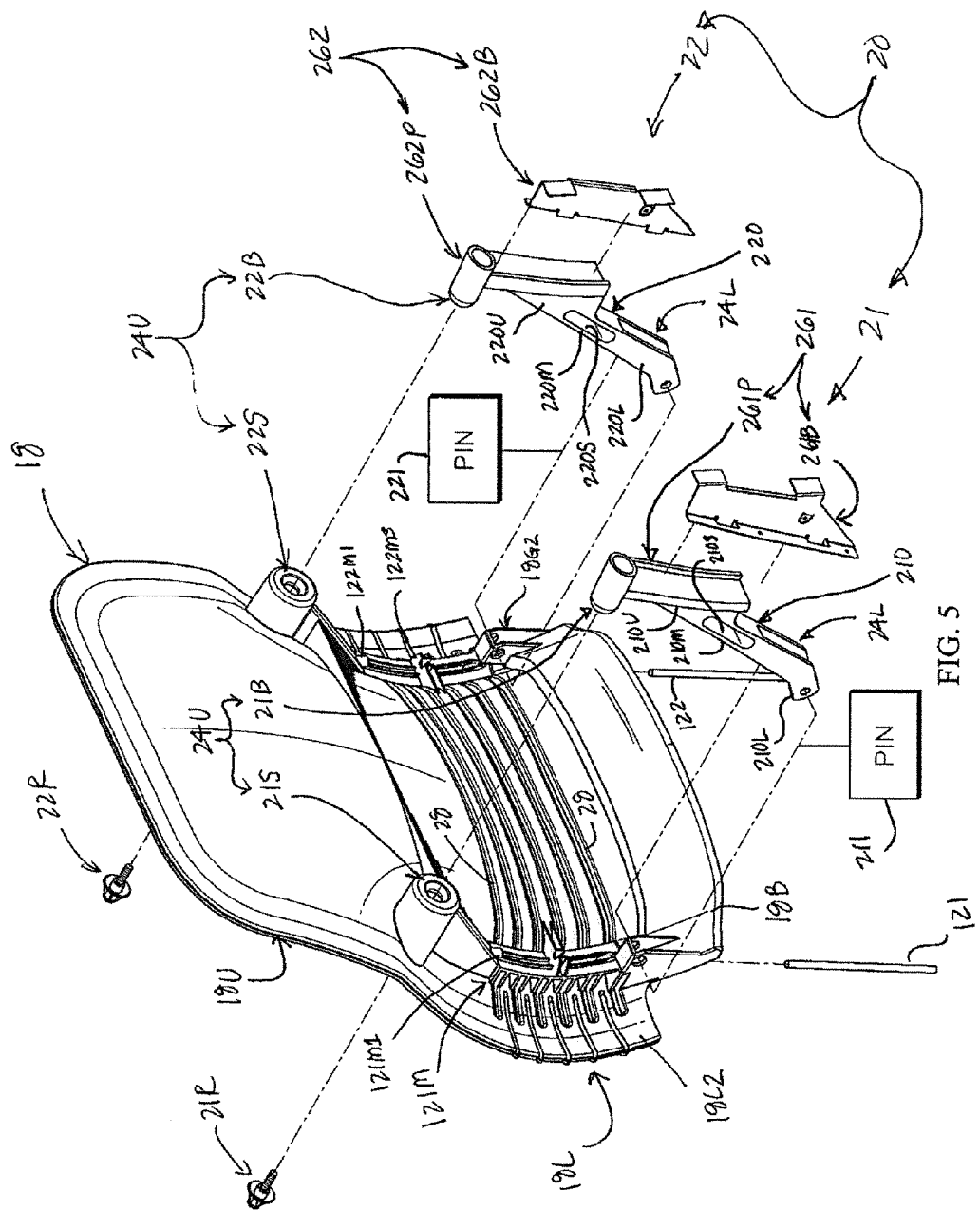
FIG. 5 is a rear exploded view of the backrest from the vehicle seat of FIG. 1.

Backrest 16B includes a passenger-controlled deformable seat shell 18, as shown, for example, in FIGS. 4-6, supported on a compliant shell-motion controller 20 including separate first and second shell mounts 21, 22 coupled to a rear portion of deformable seat shell 18. Passenger-controlled deformable seat shell 18 varies predictably in shape between an initial (lordosis) position shown in FIG. 13 suited to support an upright seated passenger as suggested in FIG. 16, a transition (mid-range) position shown in FIG. 14 to support a seated passenger transitioning between upright and slouching positions as suggested in FIG. 17, and a final (kyphosis) position shown in FIG. 15 suited to support a slouching seated passenger as suggested in FIG. 18.

First shell mount 21 of compliant shell-motion controller 20 comprises a stationary first link foundation 261 and upper and lower motion-control links 24U, 24L coupled to deformable seat shell 18 and to stationary first link foundation 261 as suggested in FIGS. 4-6. Upper and lower motion-control links 24U, 24L are configured to change the shape of the deformable seat shell 18 under various loads F1, F2 applied to seat shell 18 by a seated passenger as suggested in FIGS. 13-15 to enhance the comfort of the seated passenger. In an illustrative embodiment, first link foundation 261 includes a stationary plank 261P and a mounting bracket 261B configured to mate with stationary plank 261P as suggested in FIGS. 4-6. The stationary plank 261P may also be referred to as a stationary mount. In an illustrative embodiment, upper motion-control link 24U comprises a spheroidal (e.g. ball-and-socket) joint and lower motion-control link 24L comprises a pivotable strut 210 having an upper portion 210U coupled to stationary plank 261P of first link foundation 261 and a pivot pin 211 associated with an opposite lower portion 210L and arranged to extend along a pivot axis of pivotable strut 210, shown here as first pivot axis 24A1. The illustrated pivotable strut 210 also includes a flexural portion 210M arranged to interconnect upper and lower portions 210U, 210L and to bend about another pivot axis, as suggested in FIGS. 13-15 as second pivot axis 24A2, during shape-changing deformation of deformable seat shell 18. Pivotable strut 210 may be made of an elastic, bendable material. In an illustrative embodiment, stationary plank 261P and pivotable strut 210 cooperate to form a monolithic element.

Second shell mount 22 of compliant shell-motion controller 20 comprises a stationary second link foundation 262 and upper and lower motion-control links 24U, 24L coupled to deformable seat shell 18 and to stationary second link foundation 262. Upper and lower motion-control links 24U, 24L are configured to change the shape of the deformable seat shell 18 under various loads applied to deformable seat shell 18 by a seated passenger as suggested in FIGS. 13-15 to enhance the comfort of the seated passenger. In an illustrative embodiment, second link foundation 262 includes a stationary plank 262P and a mounting bracket 262B configured to mate with stationary plank 262P as suggested in FIGS. 4-6. The stationary plank 262P may also be referred to as a stationary mount. In an illustrative embodiment, upper motion-control link 24U comprises a spheroidal (ball-and-socket) joint and lower motion-control link 24L comprises a pivotable strut 220 having an upper portion 220U coupled to stationary plank 262P of second link foundation 262 and a pivot pin 221 associated with an opposite lower portion 210L of pivotable strut 220. The illustrated pivotable strut 220 also includes a flexural portion 220M arranged to interconnect upper and lower portions 220U, 220L and to bend about pivot axis 24A2 as suggested in FIGS. 13-15 during shape-changing deformation of deformable seat shell 18. Pivotable strut 220 may be made of an elastic, bendable material. In an illustrative embodiment, stationary plank 262P and pivotable strut 220 cooperate to form a monolithic element.

Deformable seat shell 18 changes shape in response to any shift in torso position by a passenger seated on seat bottom 14 to cause rearwardly directed variable forces generated by the position-changing passenger to be applied to deformable seat shell 18 from top to bottom as suggested in FIGS. 16-18. This example of the compliant shell-motion controller 20 is mounted in a stationary position relative to seat foundation 12 so as to allow free-pivoting movement of pivotable strut 210 of lower motion-control link 24L about pivot axis 24A1 and bending movement of flexural portion 210M of pivotable strut 210 about pivot axis 24A2 and multi-axial free-rotating movement of upper motion-control link 24 (about an indefinite number of axes, which axes have a common center) included in compliant shell-motion controller 20 to control motion of deformable seat shell 18 relative to seat foundation 12 in response to forces applied by the torso of a passenger seated on seat bottom 14 as that passenger shifts position in vehicle seat 10 as suggested in FIGS. 13-15 and 16-18.

A stationary first link foundation 261 included in first shell mount 21 of compliant shell-motion controller 20 is coupled to lie in a stationary position on a portion 61 of a seat frame 16F included in backrest 16B as suggested in FIG. 3A. Lower motion-control link 24L included in the illustrated first shell mount 21 is coupled at an inner end thereof to deformable seat shell 18 at pivot axis 24A1 and at an outer end thereof to stationary plank 261P of first link foundation 261 as suggested in FIGS. 4-6. In an illustrative embodiment, pivotable strut 210 is made of a pliable, elastic material and has a flexural portion 210M formed to include a longitudinally extending slot 210S to facilitate bending of flexural portion 210M (and thus of pivotable strut 210) about pivot axis 24A2.

Figure 7:
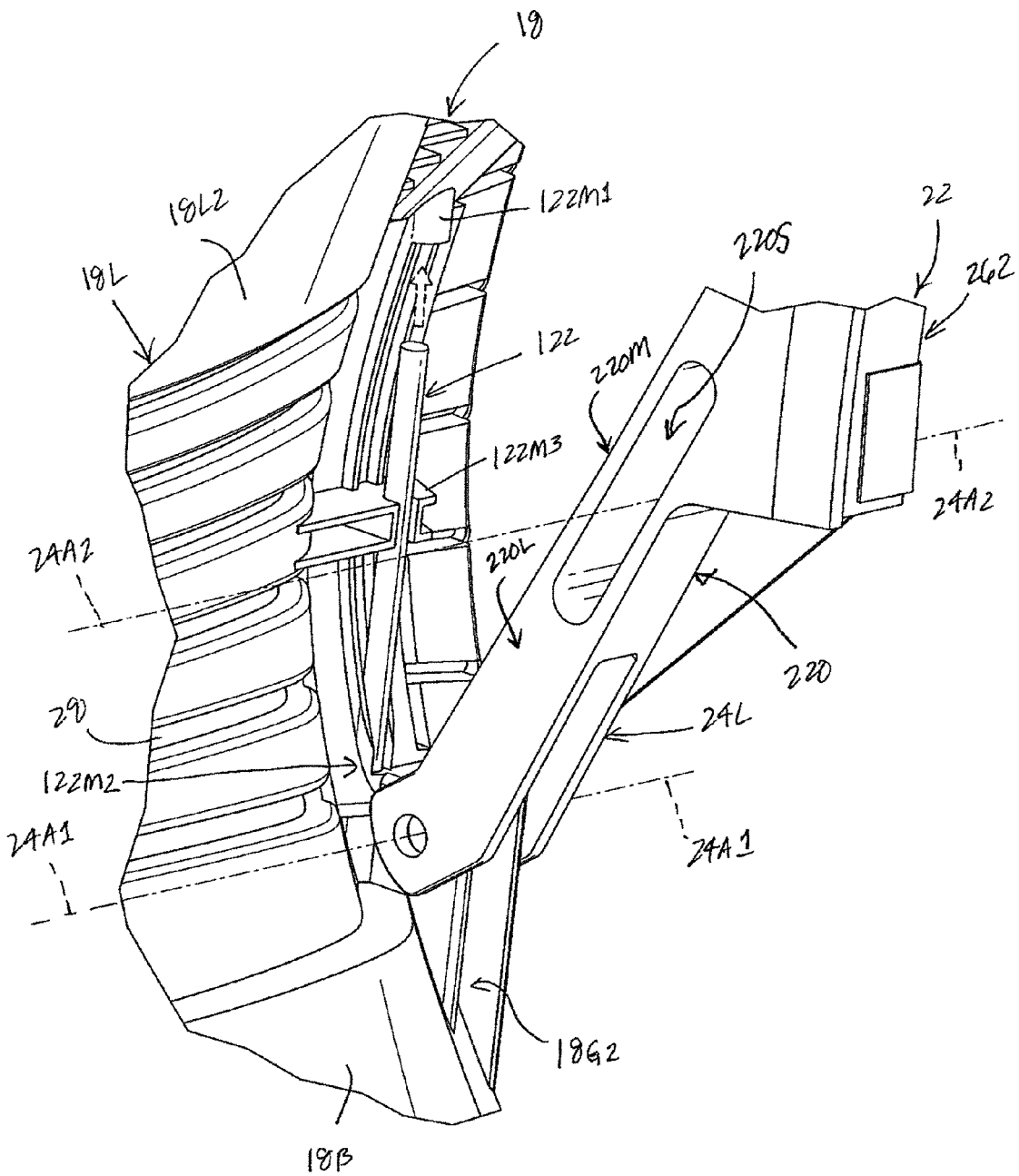
FIG. 7 is an enlarged view of the lower motion-control link of FIG. 6, also showing a return spring being installed.
Figure 8:
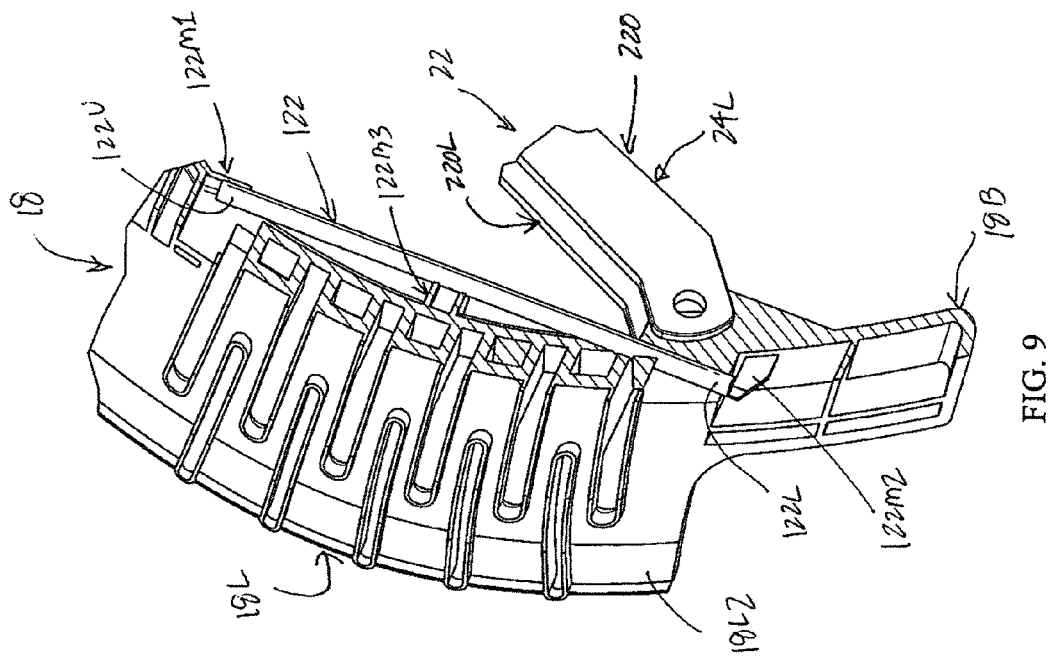
FIG. 8 is a partial cross-sectional view of the backrest of FIG. 6, showing the return spring being installed.
Figure 9:
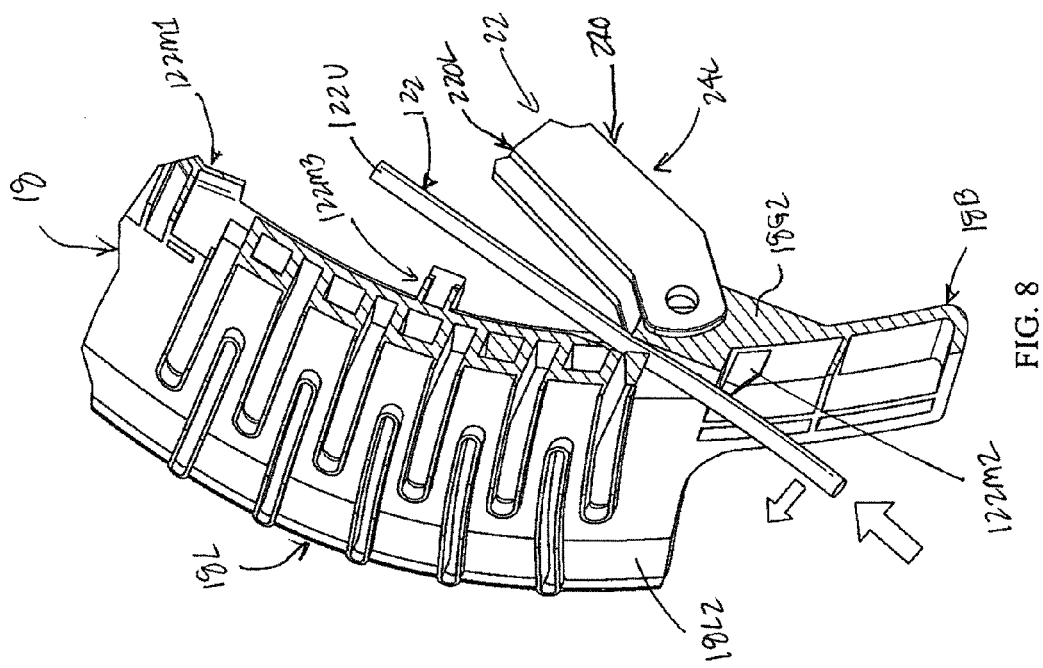
FIG. 9 is the cross-sectional view of FIG. 8, showing the installed return spring.

A stationary second link foundation 262 included in second shell mount 22 of compliant shell-motion controller 20 is coupled to lie in a stationary position on a portion 62 of a seat frame 16F included in backrest as suggested in FIGS. 3A and 7. Lower motion-control link 24L included in the illustrated second shell mount 22 is coupled at an inner end thereof to deformable seat shell 18 at pivot axis 24A1 and at an outer end thereof to stationary second link foundation 262 as suggested in FIGS. 4-6. In an illustrative embodiment, pivotable strut 220 has a flexural portion 220M formed to include a longitudinally extending slot to facilitate bending of flexural portion 220M (and thus of pivotable strut 220) about pivot axis 24A2.

Seat back 16 includes backrest 16B, a headrest 16H arranged to extend upwardly from backrest 16B, and a support frame 16F arranged to extend upwardly from seat foundation 12 and lie behind backrest 16B as suggested in FIGS. 1-3B. Backrest 16B provides a compliant shell system that is coupled to support frame 16F to allow passenger-controlled deformable seat shell 18 to move relative to support frame 16F and change shape in response to forces applied to seat shell 18 by a position-changing passenger 11 seated on seat bottom 14.

In illustrative embodiments, seat back 16 also includes a seat cover 16C and frame shield 16S as suggested in FIG. 3A. Seat cover 16C is adapted to cover a front face of deformable seat shell 18 and include an outer trim cover 98 and an inner pad 100 interposed between outer trim cover 98 and deformable seat shell 18 as suggested in FIGS. 2 and 3A. Frame shield 16S is adapted to be mounted on a rear face of seat frame 16F to trap seat frame 16F between backrest 16B and frame shield 16S as suggested in FIGS. 3A and 3B. In an illustrative embodiment, headrest 16H includes a base 16HB coupled to an upper portion of support frame 16F and a pad 16HP coupled to frame shield 16S and mounted on an exposed portion of base 16HB as suggested in FIGS. 3A, 3B, and 6.

Backrest 16B of seat back 16 includes passenger-controlled deformable seat shell 18 and compliant shell-motion controller 20. In illustrative embodiments, compliant shell-motion controller 20 includes a first shell mount 21 and a second shell mount 22 as suggested in FIGS. 5 and 6. Each of shell mounts 21, 22 includes an upper motion-control link 24U and a lower motion-control link 24L arranged to lie between deformable seat shell 18 and a portion 61 or 62 of seat frame 16F in backrest 16 as suggested in FIG. 6. Shell mounts 21 and 22 cooperate to provide means for supporting deformable seat shell 18 during deformation of seat shell 18 caused by shifting torso movement of a seated passenger and for coupling deformable seat shell 18 to support frame 16F. As shown in FIGS. 5 and 6, second shell mount 22 is arranged to lie in laterally spaced-apart relation to first shell mount 21 so that deformable seat shell 18 extends between and interconnects shell mounts 21, 22. In an illustrative embodiment, first shell mount 21 is coupled to forwardly facing surface 61 on seat frame 16F and second shell mount 22 is coupled to forwardly facing surface 62 on seat frame 16F as suggested in FIGS. 3A and 3B.

Upper and lower motion-control links 24U, 24L in each of shell mounts 21, 22 will move relative to first and second link foundations 261, 262 as suggested in FIGS. 13-15 in response to rearward forces (F1 or F2) applied to a forward-facing surface of deformable seat shell 18 by a seated passenger. The shape of deformable seat shell 18 is at least partly controlled by the design of links 24U, 24L in each shell mount 21, 22 at the seat-shell design stage. A two-sided system comprising laterally spaced-apart shell mounts 21, 22 coupled to left and right sides of deformable seat shell 18 allows the compliant shell provided by a backrest 16B in accordance with the present disclosure to be installed on a traditional vehicle seat foundation with no changes to an existing or traditional vehicle seat architecture that has been designed to resist and accommodate external impact forces.

First shell mount 21 includes a stationary first link foundation 261 coupled to a forwardly facing surface 61 provided on seat frame 16F and arranged to face toward deformable seat shell 18 as suggested in FIG. 3A. Upper and lower motion-control links 24U, 24L in first shell mount 21 cooperate to provide means for supporting deformable seat shell 18 for controlled movement relative to first link foundation 261 in response to a force F applied in a rearward direction 19 (as suggested in FIG. 10) to deformable seat shell 18 by a seated passenger 11 sitting on seat bottom 14 so that the torso of the passenger is supported comfortably by deformable seat shell 18 in a matter suited to each passenger as a function of the orientation of the passenger's torso relative to seat bottom 14 as shown, for example, in FIGS. 16-18. Links 24U, 24L of shell mount 21 along with deformable seat shell 18 cooperate to provide deformable seat shell 18 with a comfortable, customized, and sympathetic shape suited to seated passengers 11 of various shapes, sizes, and postures. Stationary first link foundation 261 is coupled to support frame 16F of seat back 16 as suggested in FIGS. 2, 3A, and 3B to lie in a fixed position relative to seat foundation 12 and does not move relative to support frame 16F during movement of seat shell 18 relative to support frame 16F as suggested in FIGS. 13-15.

Lower motion-control link 24L of the illustrated first shell mount 21 includes a pivotable strut 210 and a pivot pin 211 as suggested in FIGS. 4 and 5. Pivot pin 211 is arranged to extend along pivot axis 24A1 and is coupled to a first rigidified gusset 18G1 included in deformable seat shell 18 and to an inner end of pivotable strut 210 to provide a revolute (pivot) joint as suggested in FIG. 6 as a first revolute joint J1. Pivotable strut 210 includes a lower portion 210L associated with pivot axis 24A1, an upper portion 210U coupled to first link foundation 261, and a flexural portion 210M associated with pivot axis 24A2 and arranged to interconnect lower and upper portions 210L, 210U. Lower portion 210L includes first and second strips arranged to lie in spaced-apart parallel relation to one another as suggested in FIG. 4 and coupled at lower ends thereof to pivot pin 211 and at upper ends thereof to flexural portion 210M. Flexural portion 210M is formed to include an elongated slot 210S extending in a transverse direction to allow flexural portion 210M to bend elastically about pivot axis 24A2 to establish a flexural joint J3 at pivot axis 24A2 as suggested in FIG. 6 in response to deformation of deformable seat shell 18. Upper portion 210U includes a lower end coupled to flexural portion 210M and an upper end coupled to stationary plank 261P of first link foundation 261.

Upper motion-control link 24U of the illustrated first shell mount 21 includes a ball 21B coupled to first link foundation 261, a ball-receiving socket 21S coupled to deformable seat shell 18, and a retainer 21R as shown, for example, in FIGS. 4 and 5. Retainer 21R is configured to provide means for retaining ball 21B in ball-receiving socket 21S while allowing relative movement between ball 21B and ball-receiving socket 21S during a change in the shape of the deformable seat shell 18 as suggested in FIG. 6A and FIGS. 6D1-6D3. Upper motion-control link 24U of the illustrated first shell mount 21 is configured to establish a spheroidal joint J2 as suggested in FIG. 6.

The illustrated first link foundation 261 includes a stationary plank 261P and a mounting bracket 261B as suggested in FIGS. 4 and 5. Mounting bracket 261B is configured to provide means for retaining stationary plank 261P in a mounted position on support frame 16H of backrest 16B.

The illustrated second shell mount 22 includes a stationary second link foundation 262 coupled to a forwardly facing surface 62 provided on seat frame 16F and arranged to face toward deformable seat shell 18 as suggested in FIG. 3A. Upper and lower motion-control links 24U, 24L in second shell mount 22 cooperate to provide means for supporting deformable seat shell 18 for controlled movement relative to second link foundation 262 in response to a force F applied in a rearward direction 19 to deformable seat shell 18 by a seated passenger 11 sitting on seat bottom 14 so that the torso of the passenger is supported comfortably by deformable seat shell 18 in a matter suited to each passenger as a function of the orientation of the passenger's torso relative to seat bottom 14 shown in FIGS. 16-18. Links 24U, 24L of second shell mount 22 and deformable seat shell 18 cooperate with links 24U, 24L of first shell mount 21 to provide seat shell 18 with a comfortable, customized, and sympathetic shape suited to seated passengers 11 of various shapes, sizes, and postures. Stationary second link foundation 262 is coupled to support frame 16F of seat back 16 to lie in a fixed position relative to seat foundation 12 and does not move relative to support frame 16F during movement of seat shell 18 relative to support frame 16F. First and second link foundations 261, 262 cooperate to define a shell foundation 260 (see FIG. 6) associated with deformable seat shell 18 and coupled to support frame 16F of seat back 16 as shown, for example, in FIG. 3B.

Lower motion-control link 24L of the illustrated second shell mount 22 includes a pivotable strut 220 and a pivot pin 221 as suggested in FIGS. 4 and 5. Pivot pin 221 is arranged to extend along pivot axis 24A1 and is coupled to a second rigidified gusset 18G2 included in deformable seat shell 18 and to an inner end of pivotable strut 220 to provide a revolute (pivot) joint J1 as suggested in FIG. 6 as a first revolute joint. Pivotable strut 220 includes a lower portion 220L associated with pivot axis 24A1, an upper portion 220U coupled to second link foundation 262, and a flexural portion 220M associated with pivot axis 24A2 and arranged to interconnect lower and upper portions 220L, 220U. Lower portion 220L includes first and second strips arranged to lie in spaced-apart parallel relation to one another as suggested in FIG. 4 and coupled at lower ends thereof to pivot pin 221 and at upper ends thereof to flexural portion 220M. Flexural portion 220M may be formed to include an elongated slot 220S extending in a transverse direction, as shown, to allow flexural portion 220M to bend elastically about pivot axis 24A2 to establish a flexural joint J3 at pivot axis 24A2 as suggested in FIG. 6 in response to deformation of deformable seat shell 18. Upper portion 220U includes a lower end coupled to flexural portion 220M and an upper end coupled to stationary plank 262P of first link foundation 262.

Upper motion-control link 24U of the illustrated second shell mount 22 includes a ball 22B coupled to second link foundation 262, a ball-receiving socket 22S coupled to deformable seat shell 18 and a retainer 22R as shown, for example, in FIGS. 4 and 5. Retainer 22R is configured to provide means for retaining ball 22B in ball-receiving socket 22S while allowing relative movement between ball 22B and ball-receiving socket 22S during a change in the shape of the deformable seat shell 18 as suggested in FIG. 6A and FIGS. 6D1-6D3. Upper motion-control link 24U of the illustrated second shell mount 22 is configured to establish a spheroidal joint J2 as suggested in FIG. 6.

Second link foundation 262 may include a stationary plank 262P and a mounting bracket 262B as suggested in FIGS. 4 and 5. Mounting bracket 262B may be configured to provide means for retaining stationary plank 262P in a mounted position on support frame 16H of backrest 16B.

Passenger-controlled deformable seat shell 18 is arranged to extend along the back of a torso of passenger 11 seated on seat bottom 14 to provide lumbar and other spinal support as shown, for example, in FIGS. 16-18. Deformable seat shell 18 is made of a deformable construction and has a shape that varies in response to forces provided by passenger 11 to provide custom spinal column support suited to the needs and commands of each passenger 11 as the posture of that passenger in vehicle seat 10 changes as suggested in FIGS. 13-15 and 16-18. Deformable seat shell 18 is configured to bend and flex in a designed way to ensure proper pressure distribution and support through a wide range of seated postures. In illustrative embodiments, deformable seat shell 18 is movable relative to stationary link foundations 261, 262 that are arranged to lie in spaced-apart relation to deformable seat shell 18 as shown, for example, in FIGS. 4 and 5.

Deformable seat shell 18 is at least partly defined by a relatively thin pliable contoured sheet made of a pliable plastics material in an illustrative embodiment as suggested in FIGS. 2, 4, and 5. Deformable seat shell 18 may include a lower shell portion 18L and an upper shell portion 18U as suggested in FIG. 4. Lower shell portion 18L is arranged to lie between seat bottom 14 and upper shell portion 18U as suggested in FIG. 1. Upper shell portion 18U is arranged to lie between lower shell portion 18L and headrest 16H as also suggested in FIG. 1.

Lower shell portion 18L of deformable seat shell 18 may be formed to include a series of generally horizontally extending slots 28 as shown, for example, in FIGS. 1-6. Slots 28 may be formed to lie in vertically spaced-apart parallel relation to one another. Slots 28 are sized and shaped to facilitate controlled deformation of lower shell portion 18L of deformable seat shell 18 as suggested in FIGS. 13-15. In illustrative embodiments, each laterally extending slot 18 is filled with a flexure plug 128 shown diagrammatically in FIG. 3A. Flexure plugs 128 can be used to affix foam pad 100 and trim to the dynamic lumbar area of lower shell portion 18L while simultaneously closing off pinch points. Lower shell portion 18L is configured to have a forwardly facing convex surface 18L1 that is arranged to face toward the passenger and a rearwardly facing concave surface 18L2 that is arranged to face toward first and second link foundations 261, 262 of shell foundation 26 as suggested in FIG. 5.

Return springs 121, 122 are included in the illustrated seat back 16B and coupled to deformable seat shell 18 as shown, for example, in FIGS. 4-6 and 7-9. Return springs 121, 122 cooperate to provide means for returning deformable seat shell 18 to the initial (lordosis) position shown in FIG. 13 from any transition (mid-range) position, such as that shown in FIG. 14, or the final (kyphosis) position shown in FIG. 15 when the rearwardly directed forces (F, F1, F2) generated by a position-changing passenger seated on seat bottom 14 and previously applied by such passenger to deformable seat shell 18 have been withdrawn. In this way, return springs 121, 122 cooperate to cause deformable seat shell 18 to assume the initial (lordosis) position whenever vehicle seat 10 is unoccupied.

Return spring 121 may be coupled to a first spring-mount fixture 121M included in a near side of lower shell portion 18L of deformable seat shell 18 and aligned with first shell mount 21 as shown, for example, in FIG. 6. The illustrated first spring-mount fixture 121M includes (as suggested FIGS. 5 and 6) an upper tip-receiver socket 121M1 formed to include means for receiving an upper tip 121U of return spring 121, a lower tip-receiver socket 121M2 formed to include means for receiving an opposite lower tip 121L of return spring 121, and a central journal 121M3 located midway between sockets 121M1 and 121M2 and configured to receive a central portion of return spring 121.

Return spring 122 may be coupled to a second spring-mount fixture 122M included in a far side of lower shell portion 18L of deformable seat shell 18 and aligned with second shell mount 22 as shown, for example, in FIG. 6. The illustrated second spring-mount fixture 122 includes (as suggested in FIGS. 5-9) an upper tip-receiver socket 122M1 formed to include means for receiving an upper tip 122U of return spring 122, a lower tip-receiver socket 122M2 formed to include means for receiving an opposite lower tip 122L of return spring 122, and a central journal 122M3 located midway between sockets 122M1 and 122M2 and configured to receive a central portion of return spring 122.

Each return spring 121, 122 is made of steel spring wire in an illustrative embodiment of the present disclosure. Use of a spring wire ensures constant return force with little variation across a wide temperature range. Each return spring 121, 122 may be slid into place along a journaled path provided at the bend line in deformable seat shell 18 and held in place by captive features 121M1, 2 and 122M1, 2 built into shell 18 as suggested in FIGS. 5-9.

Each link foundation 261, 262 can be configured to mate easily with support frame 16F of seat back 16 to facilitate mounting of backrest 16B on support frame as suggested in FIGS. 3A-5. In illustrative embodiments, each mounting bracket 261B, 262B is riveted to a companion one of portions 61, 62 of support frame 16F and then each stationary plank 261P, 262P is coupled to a companion one of the mounting brackets 261B, 262B. The brackets may also be omitted and planks 261P, 262P may be mounted directly to the support frame.

In illustrative embodiments, an insert 306 (see FIG. 6A) is anchored in a sleeve 307 formed in each stationary plank 261P, 262P to mate with a companion one of retainers 21R, 22R as suggested in FIGS. 4-6A to establish spheroidal joints J2 at upper motion-control links 24U for each of shell mounts 21, 22.

Each rigidified gusset 18G1, 18G2 in the illustrated deformable seat shell 18 is formed to include a companion pin receiver 181, 182 as suggested in FIG. 5. Each pin receiver 181, 182 is configured to receive one of pivot pin 211 coupled to pivotable strut 210 or pivot pin 221 coupled to pivotable strut 220 to establish revolute (pivot) joint J1 for each of the illustrated shell mounts 21, 22. Each pivot pin 211, 221 can be separate from or integral with companion pivotable strut 210, 212.

Deformable seat shell 18 may further include a rigidified belt 18B coupled to a lower edge of lower shell portion 18L as suggested in FIGS. 3A-7. This rigidified belt 18B can be configured to provide means for retaining a predetermined lateral contour of upper and lower shell portions 18U, 18L. Rigidified gussets G1, G2 are included in the illustrated deformable seat shell 18 as suggested in FIG. 6 to stiffen an upper torso region of shell 18. The lower tip-receiver sockets 121M2, 122M2 for return springs 121, 122 may be located along a common boundary between lower shell portion 18L and rigidified belt 18B as suggested in FIG. 6.

Backrest 16B can be assembled and mounted on support frame 16F easily in just a few simple steps. First, mounting brackets 261B, 262B are anchored to support frame 16F. Second, stationary planks 261P, 262P are coupled to companion mounting brackets 261B, 262B. Third, pivotable struts 210, 220 are coupled to deformable seat shell 18 using pivot pins 211 and 221 to establish revolute (pivot) joints J1. Fourth, deformable seat shell 18 is coupled to stationary planks 261P, 262P of link foundations 261, 262 via upper motion-control links 24U, using retainers 22R, 22R, for example, to establish spheroidal joints J2. The assembly may be performed in other sequences, such as establishing joints J1 and/or J2 before coupling the planks 261P, 262P to the support frame.

Figure 10:
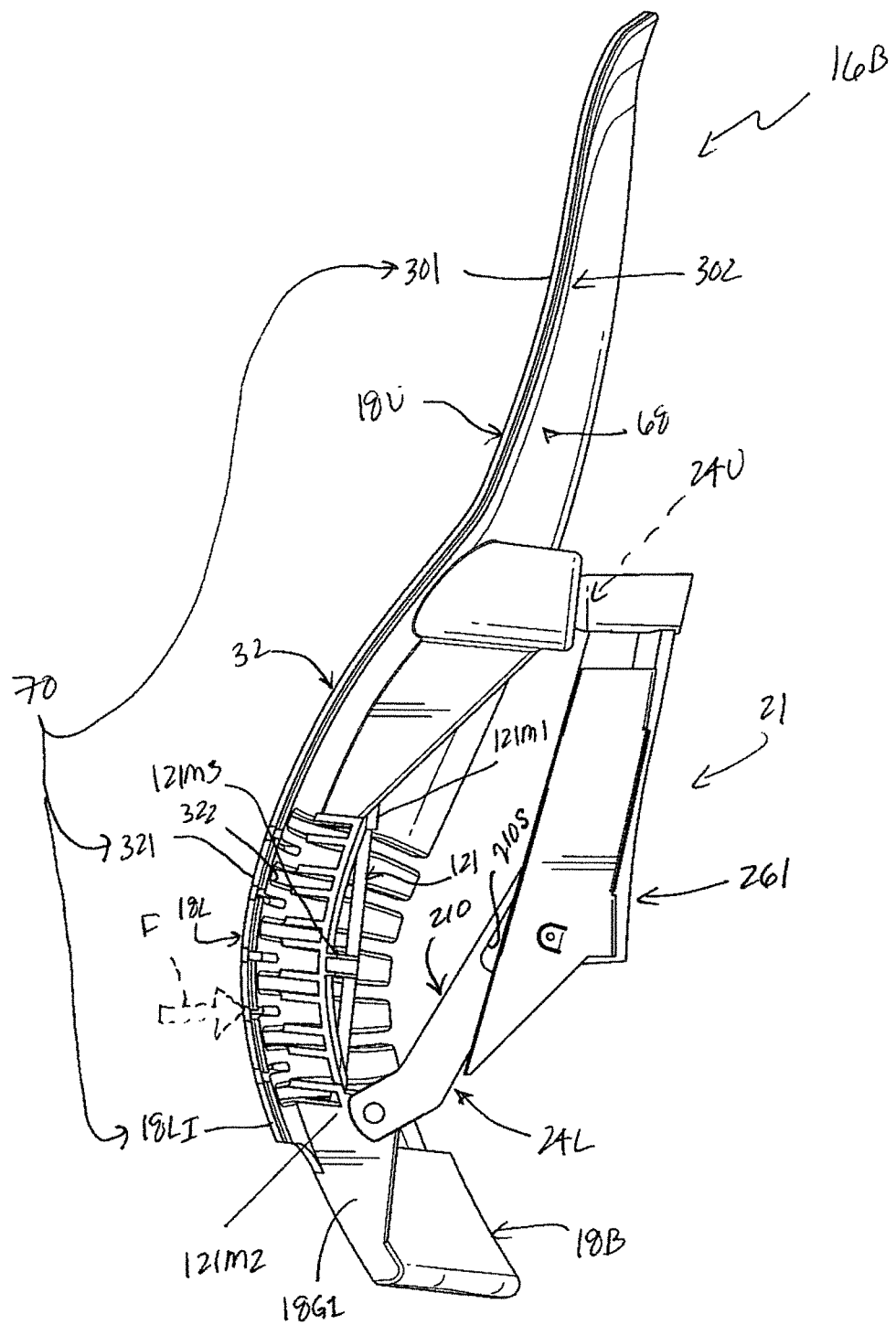
FIG. 10 is a side view of the backrest of FIG. 6, showing a force that may be applied by a seated passenger.
Figure 11:
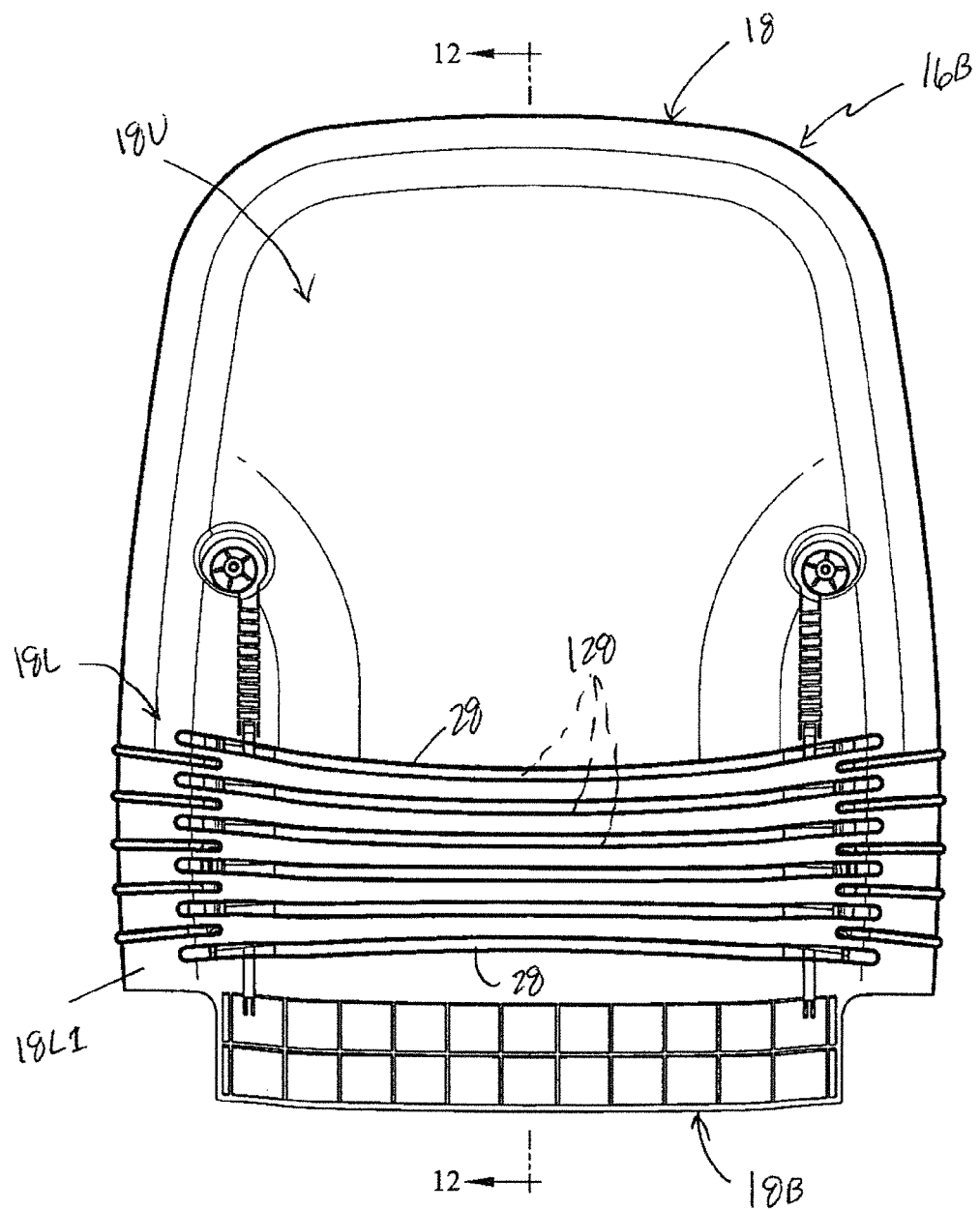
FIG. 11 is a rear view of the backrest of FIG. 6.
Figure 12:
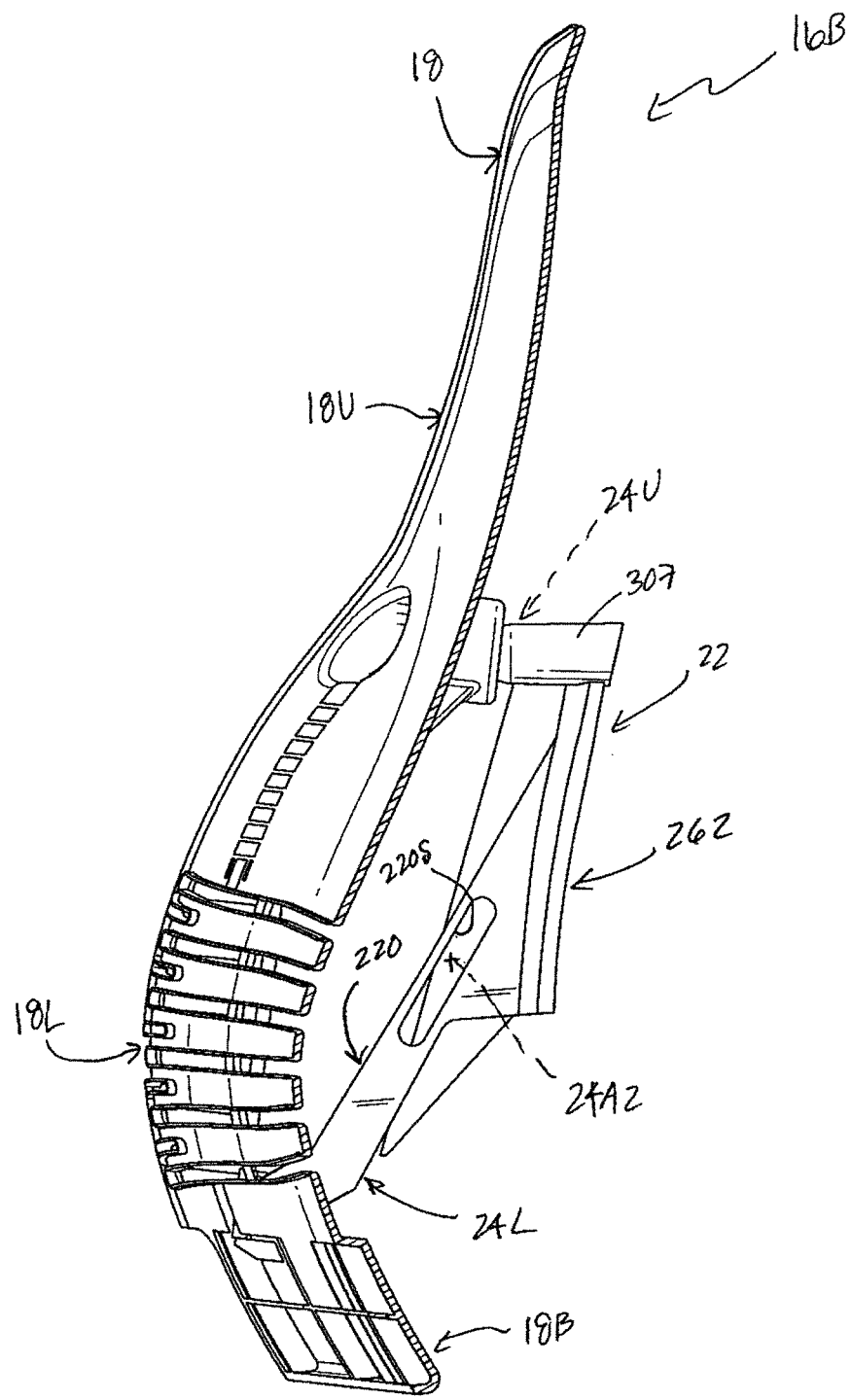
FIG. 12 is a cross-sectional view of FIG. 11.

Upper shell portion 18U may include an upper panel 30 and a lower panel 32 as shown in FIG. 4. The illustrated upper panel 30 is spaced-apart from lower shell portion 18L and is arranged to locate lower panel 32 between upper panel 30 and lower shell portion 18L. As shown in FIG. 10, upper panel 30 may be configured to have a forwardly facing concave surface 301 that is arranged to face toward the passenger seated on seat bottom 14. An opposite rearwardly facing convex surface 302 may be arranged to face toward shell foundation 26 as shown in FIG. 10. Lower panel 32 of upper shell portion 18U is configured to have a forwardly facing surface 321 and a rearwardly facing surface 322. Forwardly facing surface 321 of the illustrated lower panel 32 transitions smoothly between forwardly facing concave surface 301 and forwardly facing convex surface 18L1. Rearwardly facing surface 302 of the illustrated lower panel 32 transitions smoothly between rearwardly facing convex surface 302 and rearwardly facing concave surface 18L2. Together, the illustrated rearward facing surfaces 302, 322, and 18L2 cooperate to define a rearwardly facing shell surface 68 as shown in FIG. 10, and the illustrated forwardly facing surfaces 301, 321, and 18L1 cooperate to define a forwardly facing shell surface 70.

Compliant shell-motion controller 20 is configured to provide means attached to an automotive seat structure for controlling the shape of a comfort shell that is at least partly defined by deformable seat shell 18. When pressure is applied to the lower region (e.g., lower shell portion 18L) of deformable seat shell 18 by slouching, this causes the upper region (e.g., upper shell portion 18U) of deformable seat shell 18 to move forward following the seated passenger's shoulders. The intended result is good contact with the passenger's entire back, providing better pressure distribution. In illustrative embodiments, the compliant shell-motion controller 20 is specifically designed to ensure the proper amount of lumbar flattening coordinated with the proper amount of upper back movement.

Backrest 16B may be configured in accordance with the present disclosure to use an upper motion-control link 24 in each shell mount 21, 22 to provide a spheroidal joint J2 configured to at least partly define a rotationally compliant upper torso pivot. A lower belt region of deformable seat shell 18 may be configured to rotate about an H-point (hip-point).

Backrest 16B may be configured in accordance with the present disclosure to provide a variable arc length at the centerline and a constant arc length at a bend line above the lumbar region of deformable seat shell 18. Backrest 16B may also be configured to retain the shell contour (in its transverse cross-section) with the rigid lower belt region.

Compliant shell-motion controller 20 can be configured to provide overall lateral stability of seat back 16 during cross car loading. For instance, controller 20 mounts to the sides of support frame 16F in the illustrated example. Controller 20 can standardize the central region of seat back 16 to provide live-back kinematics while the surrounding region of the shell 18 can be customized to accommodate various product platforms using mold inserts. Controller 20 can provide predictable motion at the spinal contour by using links of fixed dimension, such as length, and may offer geometric stability across wide temperature fluctuations. Aesthetically, controller 20 can be configured to provide an unobstructed view of the volume behind deformable shell 18, as suggested in FIG. 3B, by being confined to the envelope of support frame 16F.

A backrest 116B in accordance with another embodiment of the present disclosure is shown in FIGS. 19-21. In this embodiment, each joint J2' at the upper motion-control links 124U is a revolute (pivot) joint, rather than the spheroidal (ball-and-socket) joints J2 included in the backrest 16B of FIG. 6. The joints J2' of FIG. 19 are shown as second revolute joints J2' and are provided in each of the shell mounts 421, 422 included in backrest 116B.

Backrest 116B includes passenger-controlled deformable seat shell 118 that is supported on a compliant shell-motion controller 120 including separate first and second shell mounts 421, 422 as suggested in FIG. 19. Backrest 116B can be used in a vehicle seat of the type shown in FIG. 1 instead of backrest 16B. Deformable seat shell 118 may be configured to function in the same manner as the above-described deformable seat shell 18 in the previous figures.

First shell mount 421 of the illustrated compliant shell-motion controller 120 comprises a stationary first link foundation 261 and upper and lower motion-control links 124U, 124L coupled to deformable seat shell 118 and to stationary first link foundation 261 as suggested in FIG. 19. Upper and lower motion-control links 124U, 124L are configured to change the shape of the deformable seat shell 118 under various loads applied to the seat shell in a manner similar to that shown in FIGS. 13-15 to enhance the comfort of the seated passenger. In an illustrative embodiment, first link foundation 261 includes stationary plank 261P and a mounting bracket 261B configured to mate with stationary plank 261P and with a companion support frame 16F of the type shown, for example, in FIG. 3A. In illustrative embodiments, lower motion-control link 124L comprises a first revolute (pivot) joint J1 and a flexural joint J3 while upper motion-control link 124U comprises a second revolute (pivot) joint J2' as suggested in FIG. 19.

Revolute (pivot) joint J1 of first shell mount 421 of backrest 116B is aligned with a pivot axis, such as first pivot axis 124A1, as suggested in FIGS. 19 and 20. Lower motion-control link 124L of first shell mount 421 comprises a pivotable strut 1210 having an upper portion coupled to stationary plank 261P and a pivot pin 1211 associated with an opposite lower portion of pivotable strut 1210 and arranged to extend along pivot axis 124A1.

Pivotable strut 1210 may also include flexural portion 1210M arranged to interconnect companion upper and lower portions and to bend about pivot axis 124A2 to establish flexural joint J3 during shape-changing deformation of deformable seat shell 118. The flexural portion 1220M may be formed to include an elongated slot 1220S aligned with pivot axis 124A2 as shown, for example, in FIG. 19.

Revolute (pivot) joint J2' of first shell mount 421 of backrest 116B is aligned with pivot axis 124A3 as suggested in FIGS. 19 and 21. Revolute (pivot) joint J2' is established by upper motion-control link 124U. Link 124U of the illustrated first shell mount 421 comprises a pivotable strut 1215 coupled to stationary plank 261P and a pivot pin 1216 associated with pivotable strut 1215 and arranged to extend along pivot axis 124A3 and mate with a gusset 18G3 included in deformable seat shell 118. Pivot pin 1216 can be separate from or integral with pivotable strut 1215.

Second shell mount 422 of the illustrated compliant shell-motion controller 120 comprises a stationary second link foundation 262 and upper and lower motion-control links 124U, 124L coupled to deformable seat shell 118 and to stationary second link foundation 262 as suggested in FIG. 19. Upper and lower motion-control links 124U, 124L are configured to change the shape of the deformable seat shell 118 under various loads applied to the seat shell in a manner similar to that shown in FIGS. 13-15 to enhance the comfort of the seated passenger. In an illustrative embodiment, second link foundation 262 includes stationary plank 262P and a mounting bracket 262B configured to mate with stationary plank 262P and with a companion support frame 16F of the type shown, for example, in FIG. 3A. In illustrative embodiments, lower motion-control link 124L comprises a revolute (pivot) joint J1 and a flexural joint J3, while upper motion-control link 124U comprises another or second revolute (pivot) joint J2'.

Revolute (pivot) joint J1 of the illustrated second shell mount 422 of backrest 116B is aligned with pivot axis 124A1 as suggested in FIGS. 19 and 20. Lower motion-control link 124L of the illustrated second shell mount 422 comprises a pivotable strut 1220 having an upper portion coupled to stationary plank 262P and a pivot pin 1221 associated with an opposite lower portion of pivotable strut 1220 and arranged to extend along pivot axis 124A1.

Pivotable strut 1220 may also include a flexural portion 1220M arranged to interconnect companion upper and lower portions and to bend about pivot axis 124A2 during shape-changing deformation of deformable seat-shell 118. The flexural portion 1220M may be formed to include an elongated slot 1210S aligned with pivot axis 124A2, as shown in FIG. 19, for example.

Revolute (pivot) joint J2' of the illustrated second shell mount 422 of backrest 116B may be aligned with pivot axis 124A3 as suggested in FIGS. 19 and 21. Revolute (pivot) joint J2' is established by upper motion-control link 124U. Link 124U of the illustrated second shell mount 422 comprises a pivotable strut 1225 coupled to stationary plank 262P and a pivot pin 1226 associated with pivotable strut 1225 and arranged to extend along pivot axis 124A3 and mate with a gusset 18G4 included in deformable seat shell 118. Pivot pin 1226 can be separate from or integral with pivotable strut 1225.

A backrest 516B in accordance with another embodiment of the present disclosure is shown in FIGS. 22-36. Each upper and lower motion-control link 524U, 524L in the illustrated example comprises a flexural joint. Backrest 516B may be used with the underlying structure of the vehicle seat 10 of FIG. 1, as is shown in FIGS. 22-25, or any other suitable vehicle seat structure. For convenience, many of the reference numerals in FIGS. 22-36 are carried over and remain unchanged from FIGS. 1-15, with only certain elements of backrest 516B being labeled with different reference numerals where appropriate.

With reference to the figures, exemplary vehicle seat 10 includes seat foundation 12 adapted to be anchored to vehicle floor 13, seat bottom 14 mounted on seat foundation 12, and seat back 16 arranged to extend upwardly from seat bottom 14 as suggested in FIGS. 22-25. The illustrated seat back 16 includes backrest 516B as described below to provide a compliant shell system that provides custom lumbar support to upright-sitting, position-changing, and slouching passengers seated on vehicle seat 10 as suggested, for example, in FIGS. 16-18.

Figure 26:
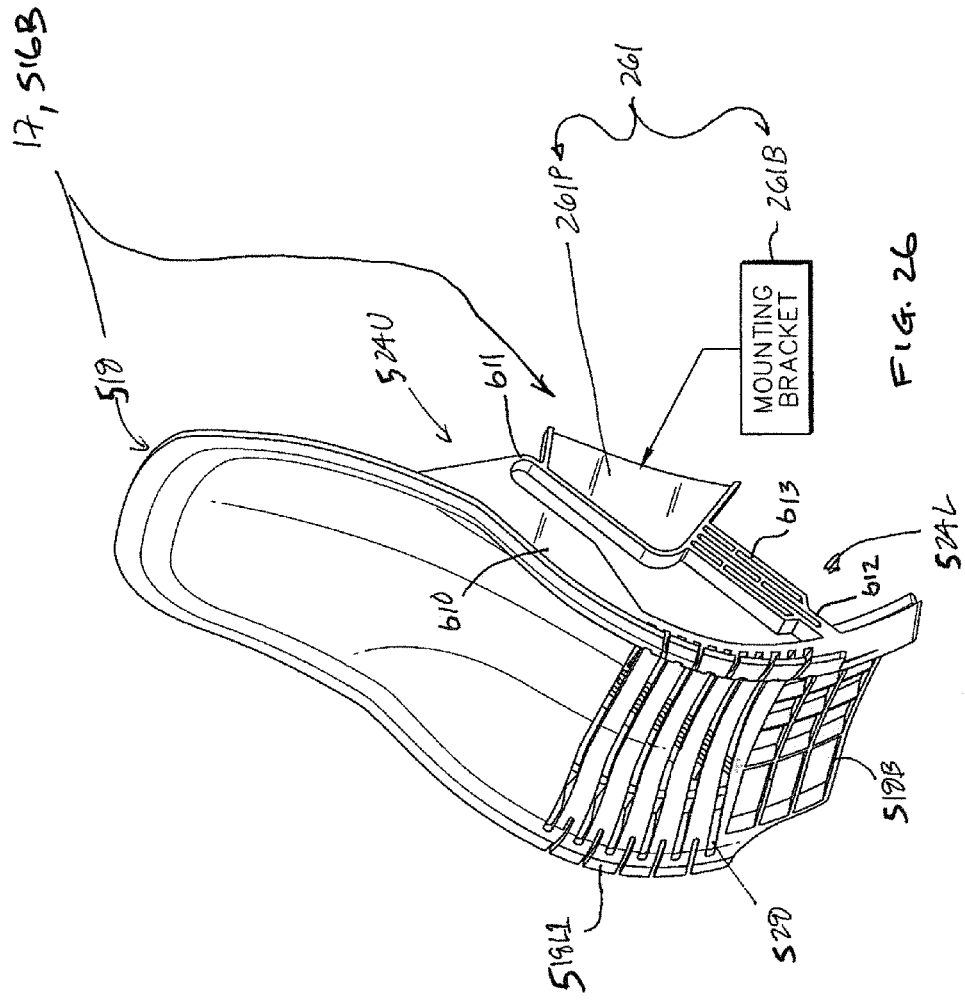
FIG. 26 is a front perspective view of one side of the backrest from the vehicle seat of FIG. 22.
Figure 27:
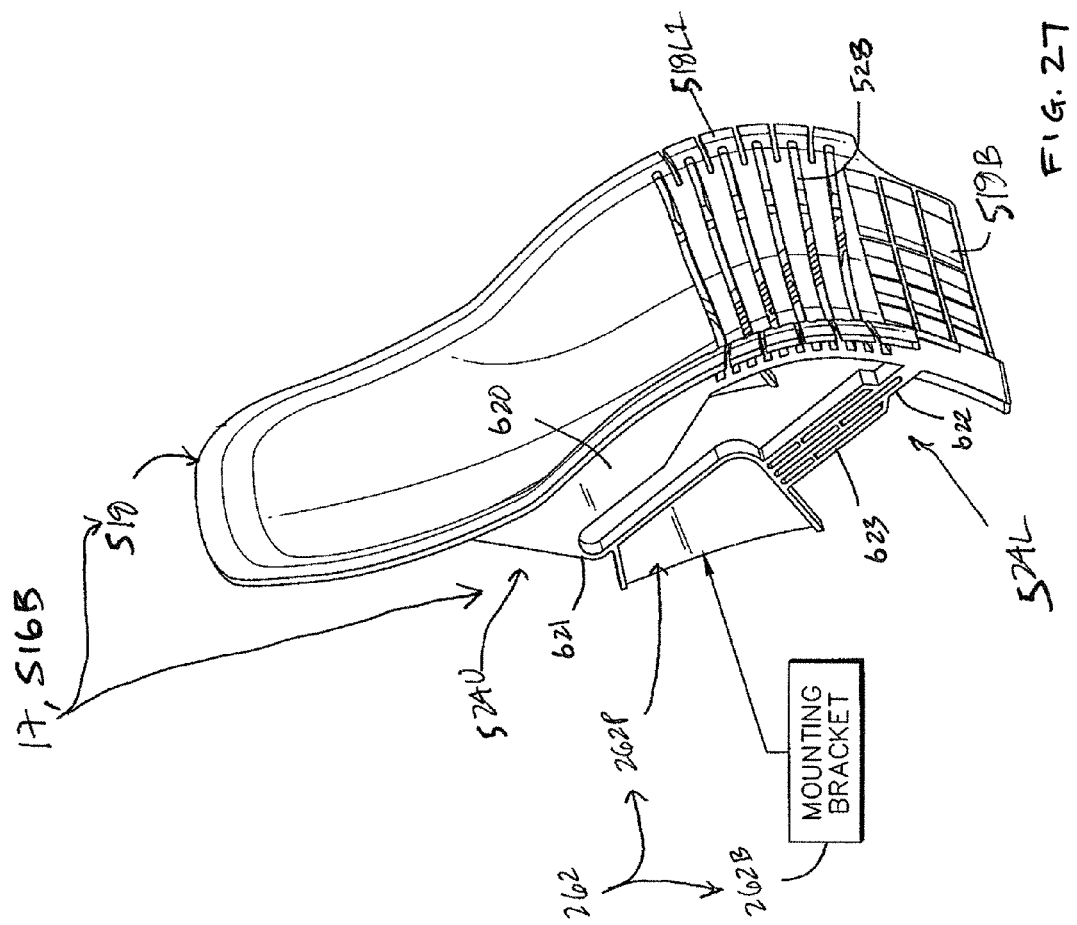
FIG. 27 is a front perspective view of an opposite side of the backrest of FIG. 26.
Figure 28:
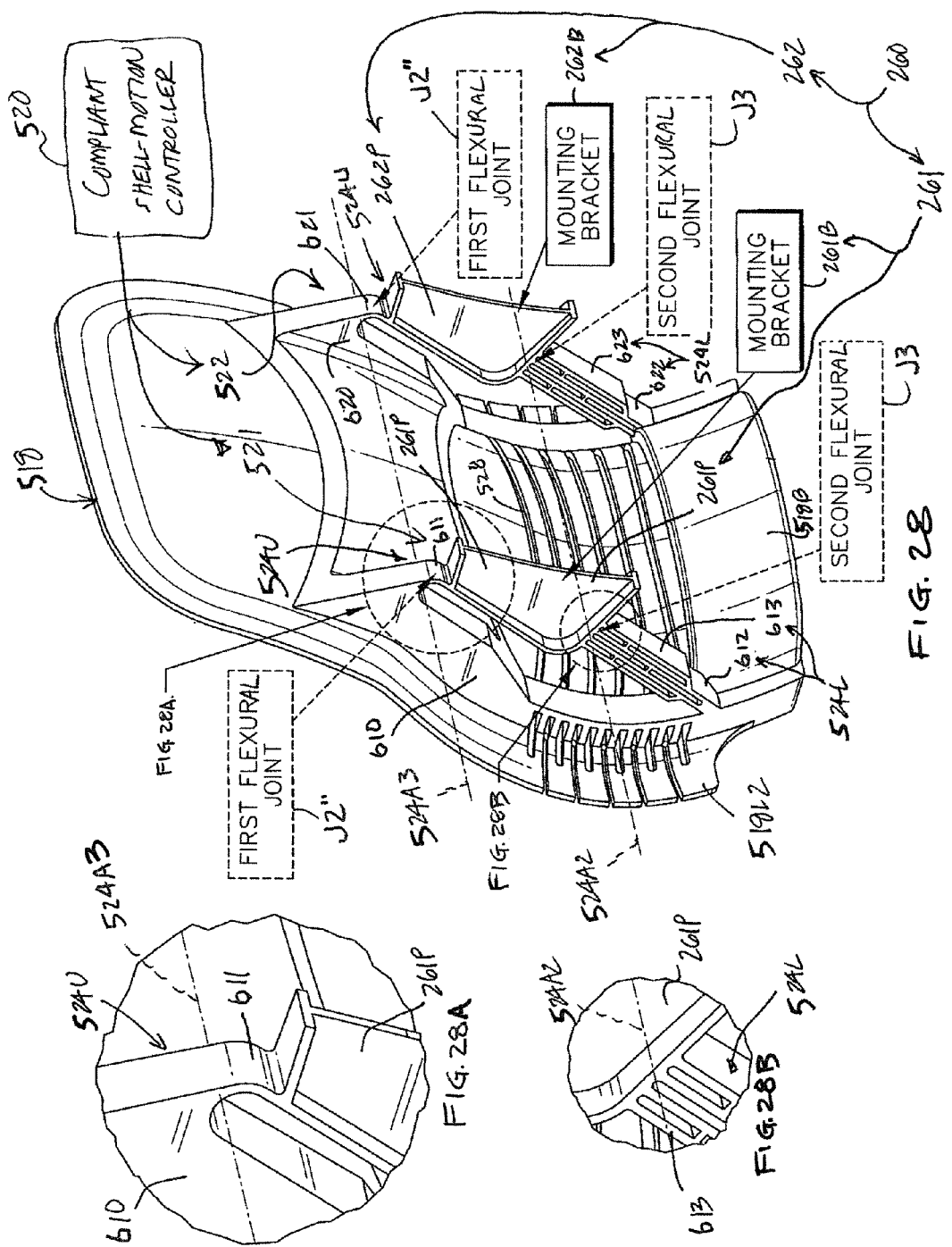
FIG. 28 is a rear perspective view of the backrest of FIG. 26, showing upper and lower motion-control links.
Figure 29:
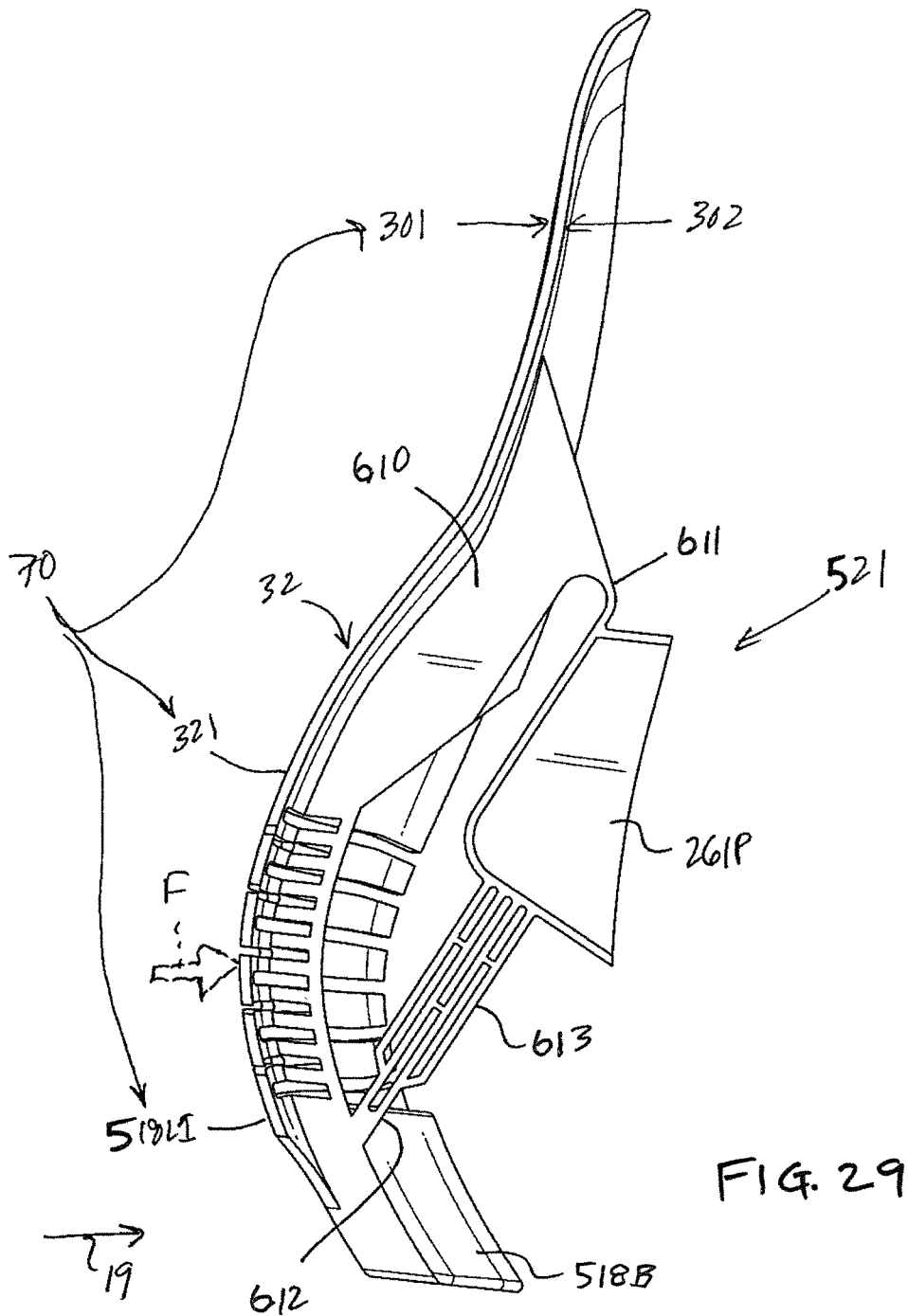
FIG. 29 is a side view of the backrest of FIG. 26, showing a force that may be applied by a seated passenger.
Figure 30:
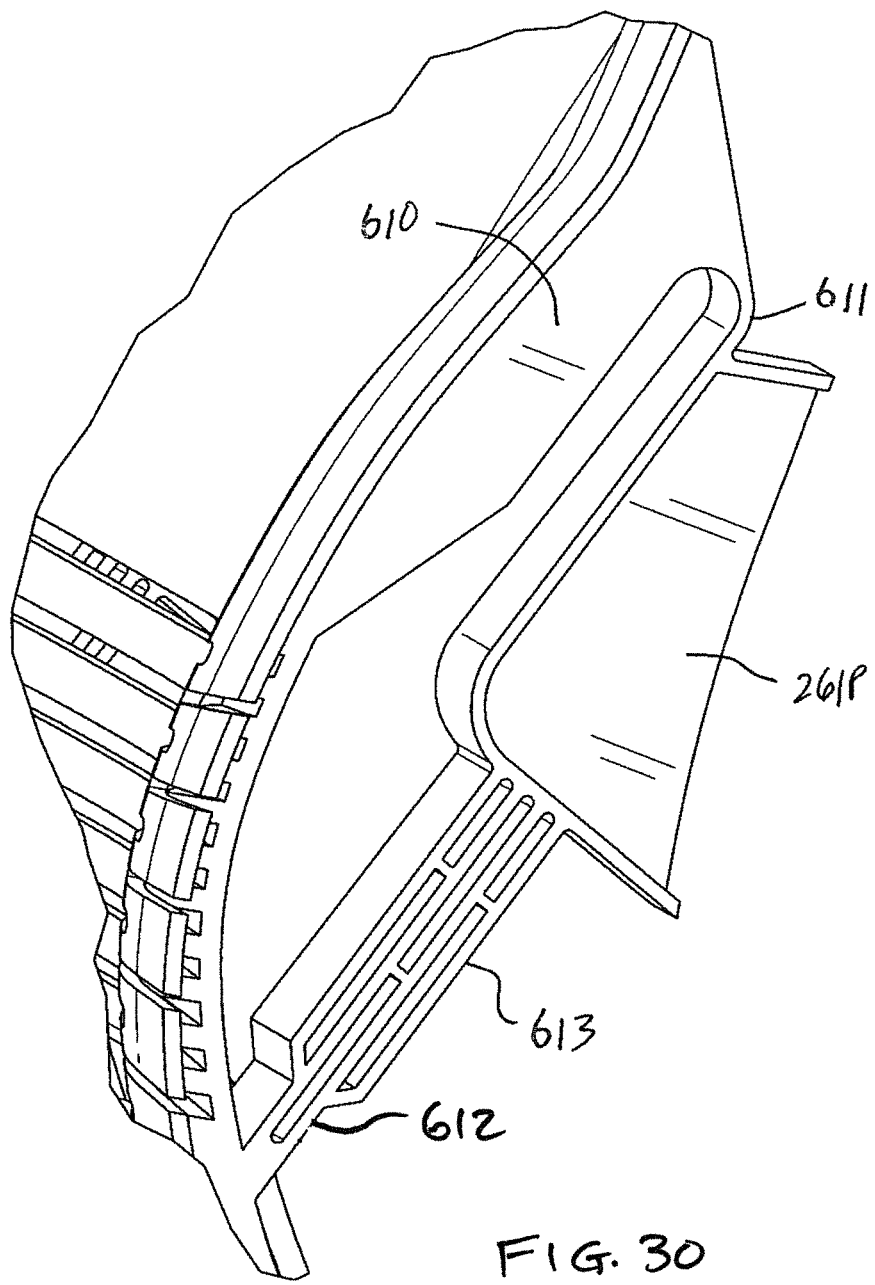
FIG. 30 is an enlarged view of FIG. 26, showing a shell mount of the backrest.

Backrest 516B includes a passenger-controlled deformable seat shell 518, as shown, for example, in FIGS. 26-28, supported on compliant shell-motion controller 520 including separate first and second shell mounts 521, 522 coupled to a rear portion of deformable seat shell 518. Passenger-controlled deformable seat shell 518 varies predictably in shape between an initial (lordosis) position shown in FIG. 34 suited to support an upright seated passenger as suggested in FIG. 16, a transition (mid-range) position shown in FIG. 35 to support a seated passenger transitioning between upright and slouching positions as suggested in FIG. 17, and a final (kyphosis) position shown in FIG. 36 suited to support a slouching seated passenger as suggested in FIG. 18.

First shell mount 521 of compliant shell-motion controller 520 comprises a stationary first link foundation 261 and upper and lower motion-control links 524U, 524L coupled to deformable seat shell 518 and to stationary first link foundation 261 as suggested in FIGS. 26-28. Stationary first link foundation 261 is coupled to a forwardly facing surface 61 provided on seat frame 16F and arranged to face toward deformable seat shell 518 as suggested in FIG. 24.

Upper and lower motion-control links 524U, 524L are configured to change the shape of the deformable seat shell 518 under various loads F1, F2 applied to seat shell 518 by a seated passenger as suggested in FIGS. 34-36 to enhance the comfort of the seated passenger. In an illustrative embodiment, first link foundation 261 includes a stationary plank 261P and a mounting bracket 261B configured to mate with stationary plank 261P as suggested in FIGS. 26-28. In an illustrative embodiment, upper motion-control link 524U comprises a flexural portion 611 that is configured and arranged to bend about a pivot axis 524A3 as suggested in FIGS. 34-36 during shape-changing deformation of deformable seat shell 518 to establish a flexural joint J2". Flexural joint J2" is shown as a first flexural joint in FIG. 28. Lower motion-control link 524L comprises a flexural portion 613 that is configured and arranged to bend about a pivot axis 524A2 as suggested in FIGS. 34-36 during shape-changing deformation of deformable seat shell 518 to establish a flexural joint J3, shown as a second flexural joint in FIG. 28.

Upper and lower motion-control links 524U, 524L in first shell mount 521 cooperate to provide means for supporting deformable seat shell 518 for controlled movement relative to first link foundation 261 in response to a force F applied in a rearward direction 19 (as suggested in FIG. 29) to deformable seat shell 518 by a seated passenger 11 sitting on seat bottom 14 so that the torso of the passenger is supported comfortably by deformable seat shell 518 in a manner suited to each passenger as a function of the orientation of the passenger's torso relative to seat bottom 14 as shown, for example, in FIGS. 16-18. Links 524U, 524L of shell mount 521 along with deformable seat shell 518 cooperate to provide deformable seat shell 518 with a comfortable, customized, and sympathetic shape suited to seated passengers 11 of various shapes, sizes, and postures. Stationary first link foundation 261 is coupled to support frame 16F of seat back 16 as suggested in FIGS. 23-25 to lie in a fixed position relative to seat foundation 12 and does not move relative to support frame 16F during movement of seat shell 518 relative to support frame 16F as suggested in FIGS. 34-36.

Second shell mount 522 of compliant shell-motion controller 520 comprises a stationary second link foundation 262 and upper and lower motion-control links 524U, 524L coupled to deformable seat shell 518 and to stationary second link foundation 262. Stationary second link foundation 262 is coupled to a forwardly facing surface 62 provided on seat frame 16F and arranged to face toward deformable seat shell 518 as suggested in FIG. 24.

Upper and lower motion-control links 524U, 524L are configured to change the shape of the deformable seat shell 518 under various loads applied to deformable seat shell 518 by a seated passenger as suggested in FIGS. 34-36 to enhance the comfort of the seated passenger. In an illustrative embodiment, second link foundation 262 includes a stationary plank 262P and a mounting bracket 262B configured to mate with stationary plank 262P as suggested in FIGS. 26-28. In an illustrative embodiment, upper motion-control link 524U comprises a flexural portion 621 that is configured and arranged to bend about pivot axis 524A3 as suggested in FIGS. 34-36 during shape-changing deformation of deformable seat shell 518 to establish flexural joint J2". Lower motion-control link 524L comprises a flexural portion 623 that is configured and arranged to bend about pivot axis 524A2 as suggested in FIGS. 34-36 during shape-changing deformation of deformable seat shell 518 to establish flexural joint J3.

Upper and lower motion-control links 524U, 524L in second shell mount 522 cooperate to provide means for supporting deformable seat shell 518 for controlled movement relative to second link foundation 262 in response to a force F applied in a rearward direction 19 to deformable seat shell 518 by a seated passenger 11 sitting on seat bottom 14 so that the torso of the passenger is supported comfortably by deformable seat shell 518 in a manner suited to each passenger as a function of the orientation of the passenger's torso relative to seat bottom 14 shown in FIGS. 16-18. Links 524U, 524L of second shell mount 522 and deformable seat shell 518 cooperate with links 524U, 524L of first shell mount 521 to provide seat shell 518 with a comfortable, customized, and sympathetic shape suited to seated passengers 11 of various shapes, sizes, and postures. Stationary second link foundation 262 is coupled to support frame 16F of seat back 16 to lie in a fixed position relative to seat foundation 12 and does not move relative to support frame 16F during movement of seat shell 518 relative to support frame 16F. First and second link foundations 261, 262 cooperate to define a shell foundation 260 (see FIG. 28) associated with deformable seat shell 518 and coupled to support frame 16F of seat back 16 as shown, for example, in FIG. 25.

Deformable seat shell 518 changes shape in response to any shift in torso position by a passenger seated on seat bottom 14 to cause rearwardly directed variable forces generated by the position-changing passenger to be applied to deformable seat shell 518 from top to bottom as suggested in FIGS. 16-18. Compliant shell-motion controller 520 is mounted in a stationary position relative to seat foundation 12 so as to allow bending movement of the flexural portions 613, 623 included in shell mounts 521, 522 of shell-motion controller 520 about pivot axis 524A2 and the flexural portions 611, 621 included in shell mounts 521, 522 of shell-motion controller 520 about pivot axis 524A3 to control motion of deformable seat shell 518 relative to seat foundation 12 in response to forces applied by the torso of a passenger seated on seat bottom 14 as that passenger shifts position in vehicle seat 10.

First link foundation 261 includes a stationary plank 261P and a mounting bracket 261B as suggested in FIGS. 26 and 27. Mounting bracket 261B is configured to provide means for retaining stationary plank 261P in a mounted position on support frame 16H of backrest 516B.

Figure 24:
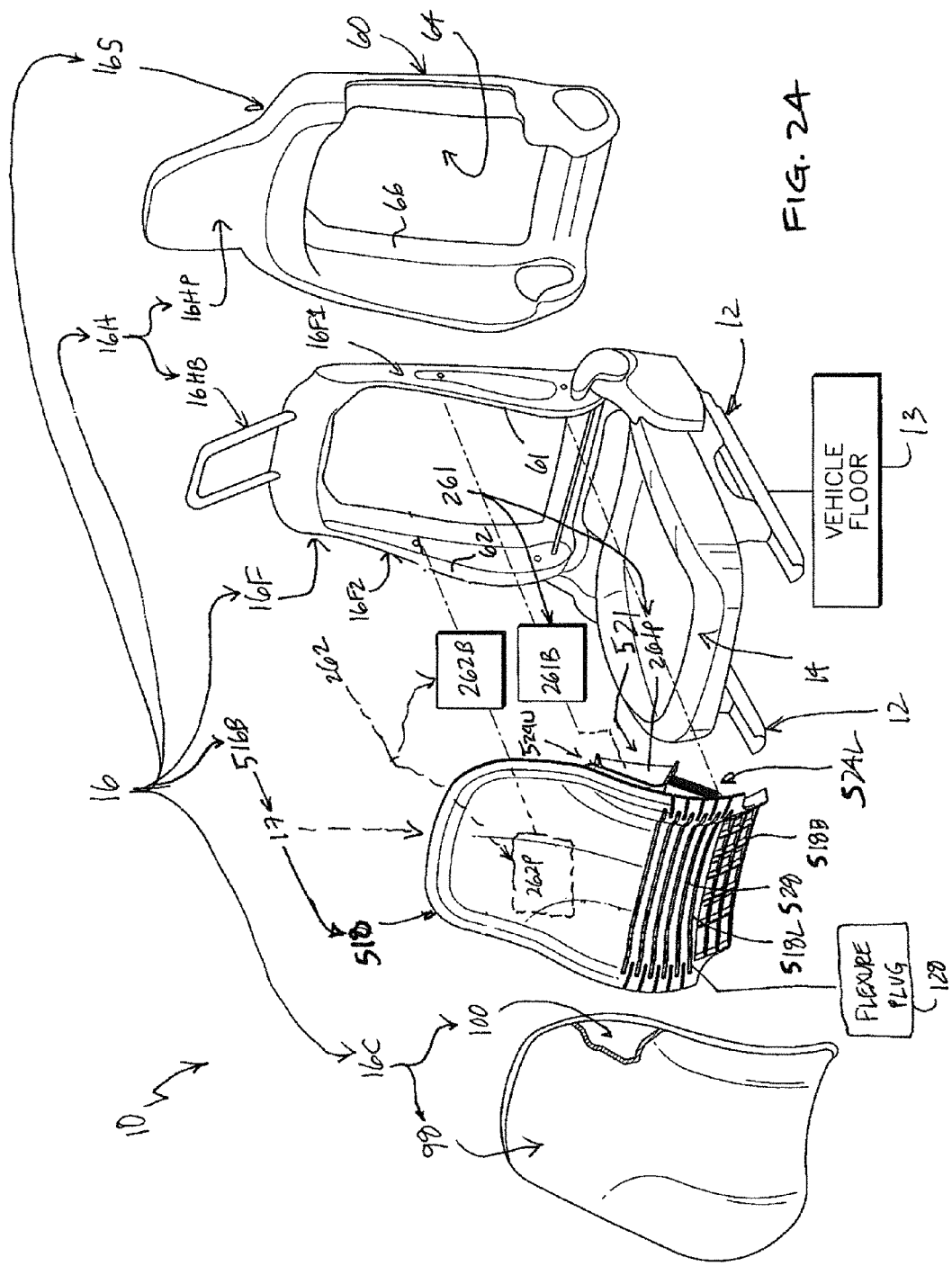
FIG. 24 is an exploded view of the vehicle seat of FIG. 22.
Figure 25:
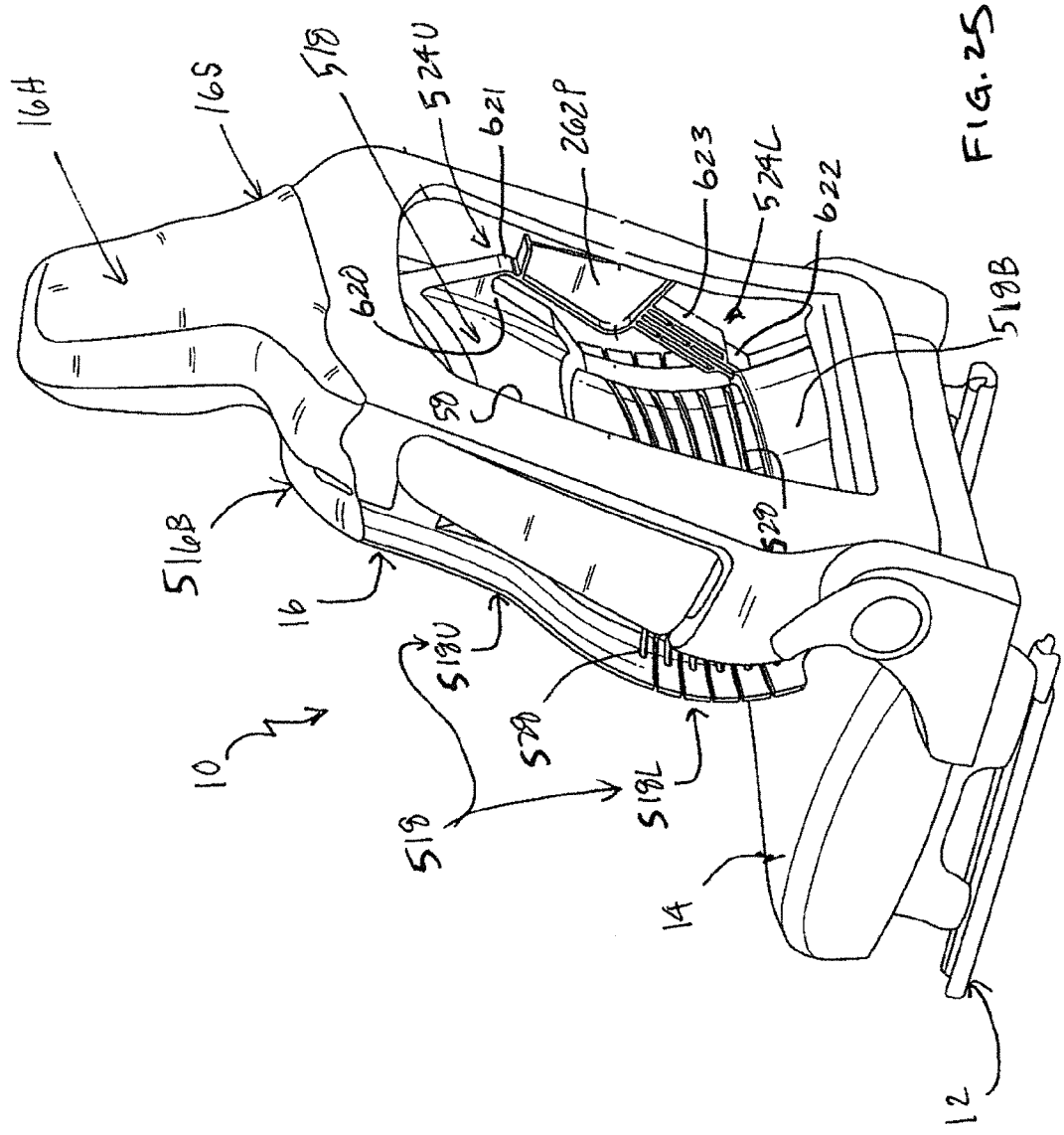
FIG. 25 is a rear perspective view of the vehicle seat of FIG. 22.

A stationary first link foundation 261 included in first shell mount 521 of compliant shell-motion controller 520 is coupled to lie in a stationary position on a portion 61 of a seat frame 16F included in backrest 16B as suggested in FIG. 24. Upper motion-control link 524U included in first shell mount 521 is coupled at an inner end thereof to deformable seat shell 518 and at an outer end thereof to stationary plank 261P of first link foundation 261 as suggested in FIGS. 26 and 28. Lower motion-control link 524L included in first shell mount 521 is coupled at an inner end thereof to deformable seat shell 518 and at an outer end thereof to stationary plank 261P of first link foundation 261 as suggested in FIG. 28.

Upper motion-control link 524U of first shell mount 521 is configured to establish flexural joint J2" at pivot axis 524A3 as suggested in FIG. 28. That upper motion-control link 524U includes an upper root portion 610 coupled to deformable seat shell 518 and a flexural portion 611 arranged to interconnect upper root portion 610 and stationary plank 261P of first link foundation 261 as shown, for example, in FIGS. 26, 28, and 29. Flexural portion 611 is configured to bend about pivot axis 524A3 during shape-changing movement of deformable seat shell 518 so as to establish the flexural joint J2" of first shell mount 521.

Lower motion-control link 524L of first shell mount 521 is configured to establish flexural joint J3 at pivot axis 524A2 as suggested in FIG. 28. That lower motion-control link 524L includes a lower root portion 612 coupled to deformable seat shell 518 and a flexural portion 613 arranged to interconnect lower root portion 612 and stationary plank 261P of first link foundation 261 as shown, for example, in FIGS. 26, 28, and 29. Flexural portion 613 is configured to bend about pivot axis 524A2 during shape-changing movement of deformable seat shell 518 so as to establish the flexural joint J3 of the first shell mount 521.

Second link foundation 262 includes a stationary plank 262P and a mounting bracket 262B as suggested in FIGS. 26 and 27. Mounting bracket 262B is configured to provide means for retaining stationary plank 262P in a mounted position on support frame 16H of backrest 16B.

A stationary second link foundation 262 included in second shell mount 522 of compliant shell-motion controller 520 is coupled to lie in a stationary position on a portion 62 of a seat frame 16F included in backrest 16B as suggested in FIG. 24. Upper motion-control link 524U included in second shell mount 522 is coupled at an inner end thereof to deformable seat shell 518 and at an outer end thereof to stationary plank 262P of second link foundation 262 as suggested in FIGS. 27 and 28. Lower motion-control link 524L included in second shell mount 522 is coupled at an inner end thereof to deformable seat shell 518 and at an outer end thereof to stationary second link foundation 262 at pivot axis 524A2 as suggested in FIGS. 27 and 28.

Upper motion-control link 524U of second shell mount 522 is configured to establish flexural joint J2″ at pivot axis 524A3 as suggested in FIG. 28. That upper motion-control link 524U includes an upper root portion 620 coupled to deformable seat shell 518 and a flexural portion 621 arranged to interconnect upper root portion 620 and stationary plank 262P of second link foundation 262 as shown, for example, in FIGS. 27 and 28. Flexural portion 621 is configured to bend about pivot axis 524A3 during shape-changing movement of deformable seat shell 518 so as to establish the flexural joint J2″ of second shell mount 522.

Lower motion-control link 524L of second shell mount 522 is configured to establish flexural joint J3 at pivot axis 524A2 as suggested in FIG. 28. That lower motion-control link 524L includes a lower root portion 622 coupled to deformable seat shell 518 and a flexural portion 623 arranged to interconnect lower root portion 622 and stationary plank 262P of second link foundation 262 as shown, for example, in FIGS. 27 and 28. Flexural portion 623 is configured to bend about pivot axis 524A2 during shape-changing movement of deformable seat shell 518 so as to establish the flexural joint J3 of the second shell mount 522.

Seat back 16 includes backrest 516B, a headrest 16H arranged to extend upwardly from backrest 516B, and a support frame 16F arranged to extend upwardly from seat foundation 12 and lie behind backrest 516B in an illustrative embodiment as suggested in FIGS. 22-25. Backrest 516B provides a compliant shell system that is coupled to support frame 16F to allow passenger-controlled deformable seat shell 518 to move relative to support frame 16F and change shape in response to forces applied to seat shell 518 by a position-changing passenger 11 seated on seat bottom 14.

In illustrative embodiments, seat back 16 also includes a seat cover 16C and frame shield 16S as suggested in FIG. 24. Seat cover 16C is adapted to cover a front face of deformable seat shell 518 and includes an outer trim cover 98 and an inner pad 100 interposed between outer trim cover 98 and deformable seat shell 518 as suggested in FIGS. 23 and 24. Frame shield 16S is adapted to be mounted on a rear face of seat frame 16F to trap seat frame 16F between backrest 516B and frame shield 16S as suggested in FIGS. 24 and 25. In an illustrative embodiment, headrest 16H includes a base 16HB coupled to an upper portion of support frame 16F and a pad 16HP coupled to frame shield 16S and mounted on an exposed portion of base 16HB as suggested in FIGS. 24, 25, and 28.

Backrest 516B of seat back 16 includes passenger-controlled deformable seat shell 518 and a compliant shell-motion controller 520. In illustrative embodiments, compliant shell-motion controller 520 includes a first shell mount 521 and a second shell mount 522 as suggested in FIGS. 27 and 28. Each of shell mounts 521, 522 includes an upper motion-control link 524U and a lower motion-control link 524L arranged to lie between deformable seat shell 518 and a portion 61 or 62 of seat frame 16F in backrest 16 as suggested in FIG. 28. Shell mounts 521 and 522 cooperate to provide means for supporting deformable seat shell 518 during deformation of seat shell 518 caused by shifting torso movement of a seated passenger and for coupling deformable seat shell 518 to support frame 16F. As shown in FIGS. 27 and 28, second shell mount 522 is arranged to lie in laterally spaced-apart relation to first shell mount 521 so that deformable seat shell 518 extends between and interconnects shell mounts 521, 522. In an illustrative embodiment, first shell mount 521 is coupled to forwardly facing surface 61 on seat frame 16F and second shell mount 522 is coupled to forwardly facing surface 62 on seat frame 16F as suggested in FIGS. 24 and 25.

Upper and lower motion-control links 524U, 524L in each of shell mounts 521, 522 will move relative to first and second link foundations 261, 262 in response to rearward forces applied to a forward-facing surface of deformable seat shell 518 by a seated passenger. The shape of deformable seat shell 518 is at least partly controlled by the design of links 524U, 524L in each shell mount 521, 522 at the seat-shell design stage. A two-sided system comprising laterally spaced-apart shell mounts 521, 522 coupled to left and right sides of deformable seat shell 518 allows the compliant shell provided by a backrest 516B in accordance with the present disclosure to be installed on a vehicle seat foundation with no changes to a traditional and/or existing vehicle seat architecture that has been designed to resist and accommodate external impact forces.

Passenger-controlled deformable seat shell 518 is arranged to extend along the back of a torso of passenger 11 seated on seat bottom 14 to provide lumbar and other spinal support. Deformable seat shell 518 may be made of a deformable construction and has a shape that varies in response to forces provided by passenger 11 to provide custom spinal column support suited to the needs and commands of each passenger 11 as the posture of that passenger in vehicle seat 10 changes. Deformable seat shell 518 is configured to bend and flex in a designed way to ensure proper pressure distribution and support through a wide range of seated postures. In illustrative embodiments, deformable seat shell 518 is movable relative to stationary link foundation 261, 262 that is arranged to lie in spaced-apart relation to deformable seat shell 518 as shown, for example, in FIGS. 26 and 27.

Deformable seat shell 518 is defined by a relatively thin pliable contoured sheet made of a pliable plastics material in an illustrative embodiment as suggested in FIGS. 23, 26, and 27. Deformable seat shell 518 includes a lower shell portion 518L and an upper shell portion 518U as suggested in FIG. 26. Lower shell portion 518L is arranged to lie between seat bottom 14 and upper shell portion 518U as suggested in FIG.

22. Upper shell portion 518U is arranged to lie between lower shell portion 518L and headrest 16H as also suggested in FIG. 22.

Lower shell portion 518L of deformable seat shell 518 is formed to include a series of generally horizontally extending slots 528 as shown, for example, in FIGS. 22-28. Slots 528 are formed to lie in vertically spaced-apart parallel relation to one another. Slots 528 are sized and shaped to facilitate controlled deformation of lower shell portion 518L of deformable seat shell 518. In illustrative embodiments, each laterally extending slot 528 is filled with a flexure plug 128 shown diagrammatically in FIG. 24. Flexure plugs 128 can be used to affix foam pad 100 and trim to the dynamic lumbar area of lower shell portion 518L while simultaneously closing off pinch points. Lower shell portion 518L is configured to have a forwardly facing convex surface 518L1 that is arranged to face toward the passenger and a rearwardly facing concave surface 518L2 that is arranged to face toward first and second link foundations 261, 262 of shell foundation 260 as suggested in FIG. 28.

In an illustrative embodiment of backrest 516B, deformable seat shell 518, a first rail comprising, in series, upper motion-control link 524U of first shell mount 521, stationary plank 261P, and lower motion-control link 524L of first shell mount 521, and a second rail comprising, in series, upper motion-control link 524U of second shell mount 522, stationary plank 262P, and lower motion-control link 524L of second shell mount 522 cooperate to from a monolithic component 517. In illustrative embodiments, monolithic component 517 is made of a pliable plastics material. In illustrative embodiments, monolithic component 517 is made of an elastic material. In illustrative embodiments, monolithic component 517 and mounting brackets 261B, 262B cooperate to form backrest 516B. It is within the scope of the present disclosure to include return springs in backrest 516B as suggested in one embodiment shown in FIG. 32 and in another embodiment shown in FIG. 33.

Figure 31:
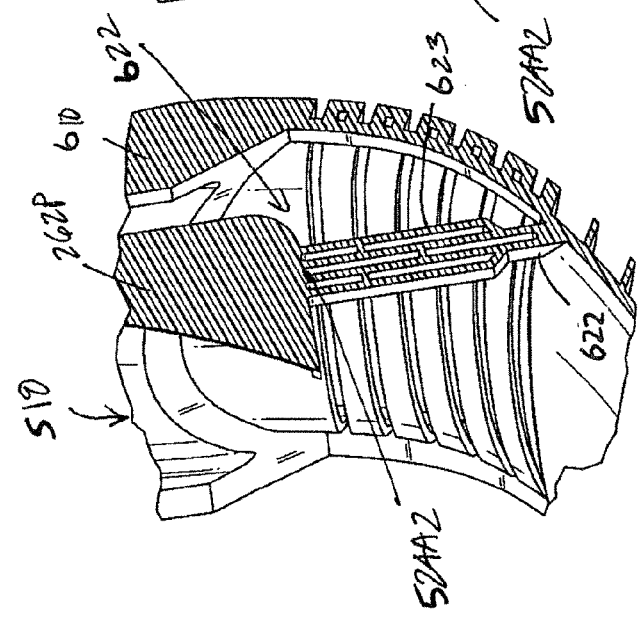
FIG. 31 is a rear perspective view of the backrest of FIG. 26, cross-sectioned at a lower motion-control link.

As suggested in FIG. 31, means for returning deformable seat shell 518 from a deformed position to an initial (lordosis) position whenever vehicle seat 10 is unoccupied is provided by the spring-back force of elastic deformable seat shell 518, flexural portion 623 of lower motion-control link 524L of second shell mount 522, and flexural portion 621 of upper motion-control link 524U of second shell mount 522 (assisted by flexural portions 611, 613 of first shell mount 521 shown in FIG. 28). By adjusting the height of the ribs associated with slots 528, the compliance of backrest 516B can be tuned in accordance with the present disclosure.

Figure 32:
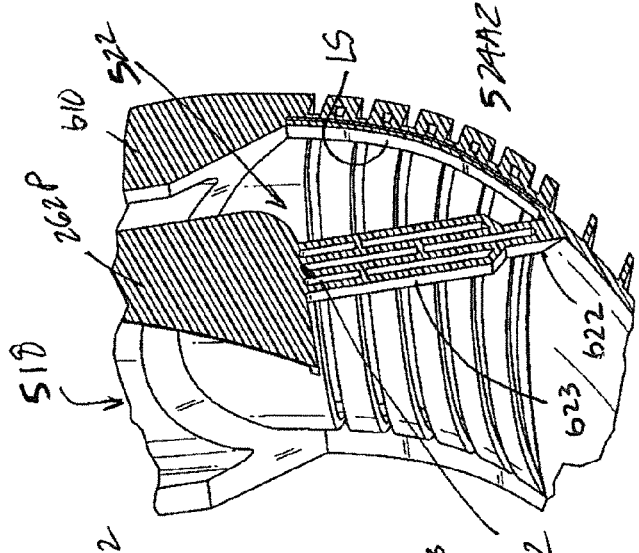
FIG. 32 is the rear perspective view of FIG. 31, showing an alternative embodiment of the backrest that includes a leaf spring as a return spring.

As suggested in FIG. 32, for enhanced reliability, repeatability, and lifetime performance, the spring-back force can be augmented by mounting a metal leaf spring LS (round or sheet stock on the far rear side of deformable seat shell 518). Leaf spring LS can be overmolded or attached using any suitable means. Leaf spring LS can extend from root portion 622 to root portion 610 in an illustrative embodiment. Another leaf spring (not shown) can be mounted on the near rear side of deformable seat shell 518 if desired.

Figure 33:
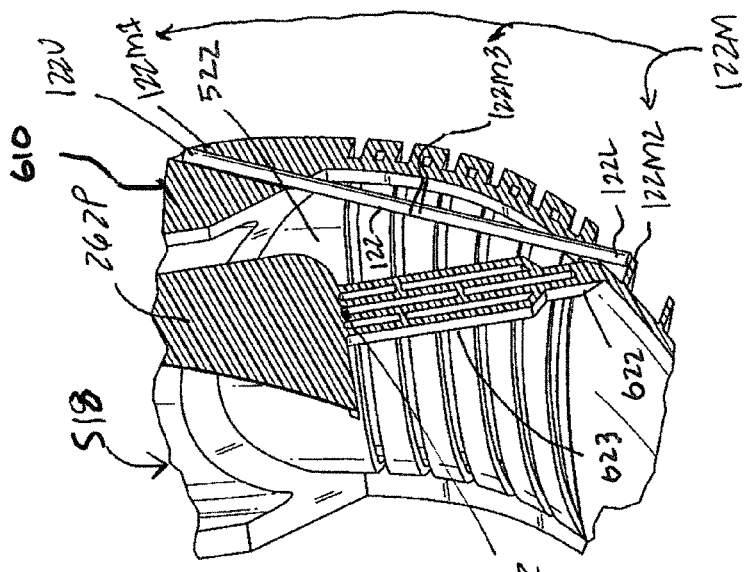
FIG. 33 is the rear perspective view of FIG. 31, showing another alternative embodiment of the backrest that includes a spring wire as a return spring.

As suggested in FIG. 33, a return spring 122 can be mounted on the far rear side of deformable seat shell 518. A similar return spring (not shown) can be mounted on the near rear side of deformable seat shell 518 if desired. The diameter of the spring wire 122 will at least partly dictate the compliant response.

Return springs 122 can be included in seat back 516B and coupled to deformable seat shell 518 as shown, for example, in FIG. 33. Return spring 122 is configured to provide means for returning deformable seat shell 518 to the initial (lordosis) position from any transition (mid-range) position or the final (kyphosis) position as soon as the rearwardly directed forces (F, F1, F2) generated by a position-changing passenger seated on seat bottom 14 and previously applied by such passenger to deformable seat shell 518 have been withdrawn. In an illustrative embodiment, another similar return spring 121 can be coupled to the near side of deformable seat shell 518. In this way, return springs 121, 122 cooperate to cause deformable seat shell 518 to assume the initial (lordosis) position whenever vehicle seat 10 is unoccupied.

Return spring 122 is coupled to a second spring-mount fixture 122M included in a far side of lower shell portion 518L of deformable seat shell 518 and aligned with second shell mount 522 as shown, for example, in FIG. 33. Second spring-mount fixture 122M includes an upper tip-receiver socket 122M1 formed to include means for receiving an upper tip 122U of return spring 122, a lower tip-receiver socket 122M2 formed to include means for receiving an opposite lower tip 122L of return spring 122, and a central journal 122M3 located midway between sockets 122M1 and 122M2 and configured to receive a central portion of return spring 122.

Return spring 122 is made of steel spring wire in an illustrative embodiment of the present disclosure. Use of spring wire ensures constant return force with little variation across a wide temperature range. Return spring 122 is slid into place along a journaled path provided at the bend line in deformable seat shell 518 and held in place by captive features 121M1, 2 and 122M1, 2 built into shell 518 as suggested in FIG. 33.

Each link foundation 261, 262 is configured to mate easily with support frame 16F of seat back 16 to facilitate mounting of backrest 516B on support frame 16F. In illustrative embodiments, each mounting bracket 261B, 262B is riveted to a companion one of portions 61, 62 of support frame 16F and then each stationary plank 261P, 262P is coupled to a companion one of the mounting brackets 261B, 262B.

Deformable seat shell 518 further includes a rigidified belt 518B coupled to a lower edge of lower shell portion 518L as suggested in FIGS. 24-29. This rigidified belt 518B is configured to provide means for retaining a predetermined lateral contour of upper and lower shell portions 518U, 518L. Lower tip-receiver sockets 121M2, 122M2 for return springs 121, 122 are located along a common boundary between lower shell portion 518L and rigidified belt 518B as suggested in FIG. 28.

Upper shell portion 518U includes an upper panel 30 and a lower panel 32 as shown in FIG. 26. Upper panel 30 is spaced-apart from lower shell portion 518L and is arranged to locate lower panel 32 between upper panel 30 and lower shell portion 518L. Upper panel 30 is configured to have a forwardly facing concave surface 301 that is arranged to face toward the passenger seated on seat bottom 14. An opposite rearwardly facing convex surface 302 is arranged to face toward shell foundation 260. Lower panel 32 of upper shell portion 518U is configured to have a forwardly facing surface 321 and a rearwardly facing surface 322. Forwardly facing surface 321 of lower panel 32 transitions smoothly between forwardly facing concave surface 301 and forwardly facing convex surface 518L1. Rearwardly facing surface 302 of lower panel 32 transitions smoothly between rearwardly facing convex surface 302 and rearwardly facing concave surface 518L2. Together, rearwardly facing surfaces 302, 322, and 518L2 cooperate to define a rearwardly facing shell surface 68. Forwardly facing surfaces 301, 321, and 518L1 cooperate to define a forwardly facing shell surface 70.

Compliant shell-motion controller 520 is configured to provide means attached to an automotive seat structure for controlling the shape of a comfort shell defined by deformable seat shell 518. When pressure is applied to the lower region (e.g., lower shell portion 518L) of deformable seat shell 518 by slouching, this causes the upper region (e.g., upper shell portion 518U) of deformable seat shell 518 to move forward following the seated passenger's shoulders. The end result is good contact to the passenger's entire back creating better pressure distribution. In illustrative embodiments, the design of compliant shell-motion controller 520 is very specific to ensure the proper amount of lumbar flattening coordinated with the proper amount of upper back movement.

Backrest 516B is configured in accordance with the present disclosure to provide a variable arc length at the centerline and a constant arc length at a bend line above the lumbar region of deformable seat shell 518. Backrest 516B is also configured to retain the shell contour (in its transverse cross-section) with the rigid lower belt region.

Compliant shell-motion controller 520 is configured to provide overall lateral stability of seat back 16 during cross car loading. Controller 520 mounts to the sides of support frame 16F. Controller 520 standardizes the central region of seat back 16 to provide live-back kinematics while the surrounding region of the shell 518 can be customized to accommodate various product platforms using mold inserts. Controller 520 provides predictable motion at the spinal contour by using a link of fixed length and offers geometric stability across wide temperature fluctuations. Aesthetically, controller 520 provides an unobstructed view of the volume behind deformable shell 518 as suggested in FIG. 25 by being confined to the envelope of support frame 16F.

It is to be understood that the ordinal descriptors (e.g., first, second, etc.) used in the above description and accompanying figures with reference to individual vehicle seat components are not indicators of importance, order, location, inter-embodiment correspondence, or the necessity of other similarly named components. Nor do such descriptors necessarily correspond to any ordinals used in the appended claims. For example, a "first" component does not imply the existence of a "second" one of such component, and vice versa. In another example, the "first" joint of one embodiment of the above-described backrest may be established by an upper motion-control link, while the "first" joint of another embodiment may be established by a lower motion-control link, and the two joints may be the same, similar, or different, regardless of the use of the same ordinal.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat, comprising:
   a foundation adapted for attachment to a vehicle floor;
   a seat bottom mounted on the seat foundation;
   a support frame extending upwardly from the seat bottom;
   a deformable seat shell adapted to assume various shapes between an initial position and a final position in response to a variable rearward load applied by the torso of a passenger seated on the seat bottom; and
   a compliant shell-motion controller that couples the deformable seat shell with the support frame via one or more stationary mounts and upper and lower motion-control links that each extend between a first end attached to the stationary mount(s) and a second end attached to the deformable seat shell, wherein the upper motion-control links, the lower motion-control links, or both, have a flexural portion located between and interconnecting the first and second ends that bends about an axis located between and the first and second ends during shape-changing deformation of the deformable seat shell caused by the rearward load applied by the torso of the seated passenger.

2. A vehicle seat as defined in claim 1, wherein the shell-motion controller includes two stationary mounts and two lower motion-control links each having the flexural portion at a location between the deformable seat shell and one of the stationary mounts.

3. A vehicle seat as defined in claim 2, wherein the shell-motion controller includes two upper motion-control links each having a joint coupling the deformable seat shell to one of the stationary mounts, said joint being either a spheroidal joint or a revolute joint.

4. A vehicle seat as defined in claim 2, wherein the shell-motion controller includes two upper motion-control links each having a flexural portion located between the deformable seat shell and one of the stationary mounts, whereby the upper and lower motion-control links include flexural portions.

5. A vehicle seat as defined in claim 2, wherein the lower motion-control links each have a revolute joint at said second end coupling the flexural portion to the deformable seat shell.

6. A vehicle seat as defined in claim 1, wherein each of the upper and lower motion-control links includes a revolute joint coupling the stationary mount(s) to the deformable seat shell.

7. A vehicle seat as defined in claim 1, wherein the deformable seat shell, the stationary mount(s), and the upper and lower motion-control links are formed together as a monolithic structure.

8. A vehicle seat as defined in claim 1, further comprising a return spring that biases the deformable seat shell toward the initial position.

9. A vehicle seat, comprising:
   a foundation adapted for attachment to a vehicle floor;
   a seat bottom mounted on the seat foundation;
   a support frame extending upwardly from the seat bottom;
   a deformable seat shell adapted to assume various shapes between an initial position and a final position in response to a variable rearward load applied by the torso of a passenger seated on the seat bottom; and
   first and second shell mounts, each shell mount having a stationary mount coupled to the support frame at a fixed location and first and second movable joints coupling the deformable seat shell to the stationary mount, wherein each of the first and second joints is configured for movement about respective first and second axes during shape-changing deformation of the deformable seat shell, and wherein at least one of the joints is a flexural joint configured for non-rotational bending movement about one of the axes.

10. A vehicle seat as defined in claim 9, wherein each shell mount includes first and second flexural portions, each flexural portion being configured to bend about a different one of the axes during shape-changing deformation of the deformable seat shell to establish the first and second joints as flexural joints.

11. A vehicle seat as defined in claim 9, wherein each shell mount includes a flexural portion configured to bend about one of the axes during shape-changing deformation of the deformable seat shell to establish the first joint as a flexural joint, and the second joint is a revolute joint.

12. A vehicle seat as defined in claim 11, wherein the revolute joint couples the flexural portion to the deformable seat shell and each shell mount further comprises a another revolute joint or a spheroidal joint that couples the deformable seat shell to the stationary mount.

13. A vehicle seat as defined in claim 9, wherein each shell mount includes a flexural portion configured to bend about one of the axes during shape-changing deformation of the deformable seat shell to establish the first joint as a flexural joint, and the second joint is a spheroidal joint configured for movement about multiple axes.

14. A vehicle seat as defined in claim 9, wherein each shell mount includes a flexural joint, a revolute joint, and a spheroidal joint.

15. A vehicle seat as defined in claim 9, wherein the deformable seat shell is part of a monolithic structure that further includes the first and second shell mounts.

* * * * *